(12) United States Patent
Chen et al.

(10) Patent No.: US 10,821,607 B2
(45) Date of Patent: Nov. 3, 2020

(54) AUTOMOBILE CALIBRATION DEVICE

(71) Applicant: AUTEL INTELLIGENT TECHNOLOGY CORP., LTD., Guangdong (CN)

(72) Inventors: Yong Chen, Guangdong (CN);
Xinguang Tang, Guangdong (CN);
Xiaolong Wang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/705,060

(22) Filed: Dec. 5, 2019

(65) Prior Publication Data

US 2020/0147800 A1    May 14, 2020

Related U.S. Application Data

(63) Continuation-in-part of application No. PCT/CN2019/083538, filed on Apr. 19, 2019.

(30) Foreign Application Priority Data

Apr. 20, 2018    (CN) .......................... 2018 1 0362135

(51) Int. Cl.
| | |
|---|---|
| *G06F 11/30* | (2006.01) |
| *B25J 9/16* | (2006.01) |
| *B60S 5/00* | (2006.01) |
| *B66F 9/24* | (2006.01) |
| *B25B 11/02* | (2006.01) |

(52) U.S. Cl.
CPC .............. *B25J 9/1692* (2013.01); *B60S 5/00* (2013.01); *B66F 9/24* (2013.01); *B25B 11/02* (2013.01)

(58) Field of Classification Search
CPC ...................................................... B25J 9/1692
See application file for complete search history.

(56) References Cited

U.S. PATENT DOCUMENTS

4,630,379 A    12/1986    Wickmann et al.

FOREIGN PATENT DOCUMENTS

| CN | 201707173 U | | 1/2011 |
|---|---|---|---|
| CN | 12590796 A | | 7/2012 |
| CN | 106405526 A | | 2/2017 |
| CN | 107678004 A | * | 2/2018 |
| CN | 107678004 A | | 2/2018 |
| CN | 107843883 A | | 3/2018 |

(Continued)

OTHER PUBLICATIONS

Extended European Search Report dated May 11, 2020; Appl. No. 19789526.1.

*Primary Examiner* — Phuong Huynh

(57) ABSTRACT

The present invention relates to the fields of automobile maintenance and device calibration technologies and discloses an automobile calibration device. The automobile calibration device includes: a stand apparatus; a supporting assembly, mounted at the stand apparatus and movable in a vertical direction with respect to the stand apparatus; and a drive assembly, configured to drive the supporting assembly to move in the vertical direction with respect to the stand apparatus. In the foregoing manner, the supporting assembly can automatically ascend or descend and manual adjustment of the supporting assembly is avoided.

18 Claims, 17 Drawing Sheets

(56) References Cited

FOREIGN PATENT DOCUMENTS

| | | | |
|---|---|---|---|
| CN | 107856649 | A | 3/2018 |
| CN | 108454584 | A | 8/2018 |
| CN | 108581982 | A | 9/2018 |
| CN | 208682801 | A | 4/2019 |
| ES | 2133242 | B1 | 5/2000 |

* cited by examiner

AUTOMOBILE CALIBRATION DEVICE

This application claims priority to Chinese application No. 201810362135.0 filed on Apr. 20, 2018, hereby incorporated herein by reference in its entirety.

BACKGROUND

Technical Field

The present invention relates to the fields of automobile maintenance and device calibration technologies and in particular, to an automobile calibration device.

Related Art

In the field of automobile maintenance, particularly, in a process of advanced driver-assistance systems (ADAS) calibration, an automobile calibration device is required to perform calibration on the ADAS. The automobile calibration device includes a stand apparatus and a calibration apparatus (also called calibrator) such as a pattern calibration apparatus, a heating device, a Doppler simulator or a point laser emitter carried on the stand apparatus. During calibration of an automobile to be calibrated, the height of the calibration apparatus requires to be adjusted to enable the calibration apparatus to be at a preset position relating to the automobile to be calibrated.

During the implementation of the present invention, the inventor finds that because automobiles of different series and automobiles of different models of the same series have different body widths, shapes and designs, mounting angles or the like, the calibration apparatus on the stand apparatus needs to be adjusted frequently to enable the calibration apparatus to be at a preset position of an automobile to be calibrated. Existing automobile calibration devices are required manual height adjustment and are required more labor work.

SUMMARY

Embodiments of the present invention provide an automobile calibration device, where the automobile calibration device is provided with a motor assembly to implement automatic elevation and height adjustment.

The embodiments of the present invention provide the following technical solutions:

An automobile calibration device is provided, including: a stand apparatus; a supporting assembly, mounted at the stand apparatus and movable in a vertical direction with respect to the stand apparatus mobile; and a drive assembly, configured to drive the supporting assembly to move in the vertical direction with respect to the stand apparatus.

In some embodiments, the drive assembly includes a first drive mechanism and a transmission mechanism; the first drive mechanism is connected to the transmission mechanism and the first drive mechanism is configured to drive the transmission mechanism to move; and the transmission mechanism is configured to enable the supporting assembly to move in the vertical direction with respect to the stand apparatus.

In some embodiments, the transmission mechanism is an elevation screw rod; the elevation screw rod is movably mounted at the stand apparatus, the elevation screw rod is disposed vertically and the elevation screw rod is rotatable around the central axis of the elevation screw rod; the automobile calibration device further includes a slide block, the slide block being fixedly mounted at the supporting assembly, a threaded through hole being opened in the slide block and the central axis of the threaded through hole being disposed vertically; the elevation screw rod passes through the threaded through hole, the elevation screw rod is threaded to the threaded through hole; and the first drive mechanism is connected to the elevation screw rod and the first drive mechanism is configured to drive the elevation screw rod to rotate around the central axis of the elevation screw rod, to enable the slide block and the supporting assembly to move in the vertical direction with respect to the stand apparatus.

In some embodiments, the first drive mechanism includes a motor assembly; and the motor assembly includes a motor, the motor being configured to drive the elevation screw rod to rotate around the central axis of the elevation screw rod.

In some embodiments, the motor assembly further includes a first synchronous gear, a second synchronous gear and a drive belt; the motor is fixedly mounted at the stand apparatus, the first synchronous gear is fixedly mounted at a rotating shaft of the motor, the second synchronous gear is fixedly mounted at the elevation screw rod and the drive belt is sleeved over the first synchronous gear and the second synchronous gear; and when the motor rotates, the first synchronous gear drives the second synchronous gear through the drive belt to rotate, to enable the elevation screw rod to rotate around the central axis of the elevation screw rod.

In some embodiments, when the motor rotates in a first rotational direction, the supporting assembly ascends in the vertical direction with respect to the stand apparatus; when the motor rotates in a second rotational direction, the supporting assembly descends in the vertical direction with respect to the stand apparatus; and the first rotational direction and the second rotational direction are opposite.

In some embodiments, the drive belt includes an assembly surface and a peripheral surface of the first synchronous gear and a peripheral surface of the second synchronous gear are both provided with gear teeth, the gear teeth of the first synchronous gear and the gear teeth of the second synchronous gear being both in contact with the assembly surface and the assembly surface including a toothed area and a non-toothed area; the toothed area is capable of being meshed with the first synchronous gear and the second synchronous gear and the non-toothed area is capable of being in contact with the first synchronous gear and the second synchronous gear; when the motor rotates and the toothed area is meshed with and the first synchronous gear or the toothed area is meshed with the second synchronous gear, a rate of the second synchronous gear is a first preset rate value; when the motor rotates and the first synchronous gear and the second synchronous gear are only in contact with the non-toothed area, a rate of the second synchronous gear is a second preset rate value; and the first preset rate value is greater than the second preset rate value.

In some embodiments, the first drive mechanism further includes a control assembly; and the control assembly includes a controller, the controller being connected to the motor and at the instant the motor starts to rotate, the controller being configured to control a rotational rate of the motor to increase from 0 to a preset rate value.

In some embodiments, the control assembly further includes a limit switch and a trigger apparatus; the controller is connected to the motor and the limit switch; the trigger apparatus is disposed protruding from the supporting assembly; the limit switch is mounted at the stand apparatus and the limit switch is located above or below the trigger apparatus; and when the limit switch is triggered, the controller is configured to control the motor to stop rotation.

In some embodiments, when the limit switch is triggered, the controller is further configured to control the motor to rotate in only a preset rotational direction, to enable the trigger apparatus to leave the limit switch.

In some embodiments, the control assembly further includes an ascending button and a descending button; the ascending button and the descending button are connected to the controller; when the ascending button is triggered, the controller is further configured to control the motor to rotate in the first rotational direction, to enable the supporting assembly to ascend in the vertical direction with respect to the stand apparatus; and when the descending button is triggered, the controller is further configured to control the motor to rotate in the second rotational direction, to enable the supporting assembly to descend in the vertical direction with respect to the stand apparatus.

In some embodiments, when the ascending button and the descending button are triggered simultaneously, the controller is configured to control the motor to stop rotation.

In some embodiments, the automobile calibration device further includes a second drive mechanism, where the second drive mechanism includes a first helical gear, a second helical gear and an elevation handwheel; the elevation handwheel is mounted at the stand apparatus, the first helical gear is fixedly connected to the elevation handwheel, and the second helical gear is fixedly connected to the elevation screw rod, the first helical gear being meshed with the second helical gear; and an angle is formed between a rotational axis of the elevation handwheel and the vertical direction.

In some embodiments, the stand apparatus includes an elevation guiderail; and the elevation guiderail is disposed vertically, the supporting assembly is mounted at the elevation guiderail and the elevation guiderail is configured to guide the supporting assembly to move in the vertical direction.

In some embodiments, the automobile calibration device in the embodiments of the present invention includes: a stand apparatus; a supporting assembly, mounted at the stand apparatus and movable in a vertical direction with respect to the stand apparatus; and a drive assembly, configured to drive the supporting assembly to move in the vertical direction with respect to the stand apparatus. In the foregoing manner, the supporting assembly can automatically ascend or descend and manual adjustment of the supporting assembly is avoided.

BRIEF DESCRIPTION OF THE DRAWINGS

One or more embodiments are exemplarily described with reference to corresponding accompanying drawings. The exemplary descriptions do not constitute any limitation to the embodiments. Components having the same reference numerals in the accompanying drawings are similar components. Unless otherwise indicated, proportions are not limited in the accompanying drawings.

DETAILED DESCRIPTION

For ease of understanding of the present invention, the present invention is described below in further detail with reference to the accompanying drawings and specific embodiments. It should be noted that when an element is "fixed" on another element, the element may be directly fixed on the other element or one or more intervening elements may be present. When an element is "connected" to another element, the element may be directly connected to the other element or one or more intervening elements may be present. The terms "vertical", "horizontal", "left", "right", "inside", "outside" and similar expressions used in this specification are only used to facilitate description.

Unless otherwise defined, all technical terms and scientific terms used in this specification have the same meaning as commonly understood by a person skilled in the art to which the present invention belongs. The terms used in this specification of the present invention are merely used to describe specific embodiments but are not used to limit the present invention. The term "and/or" used in this specification includes any or all combinations of one or more listed items.

In addition, technical features described below in different embodiments of the present invention can be combined with each other without causing any conflict.

Figure 1:
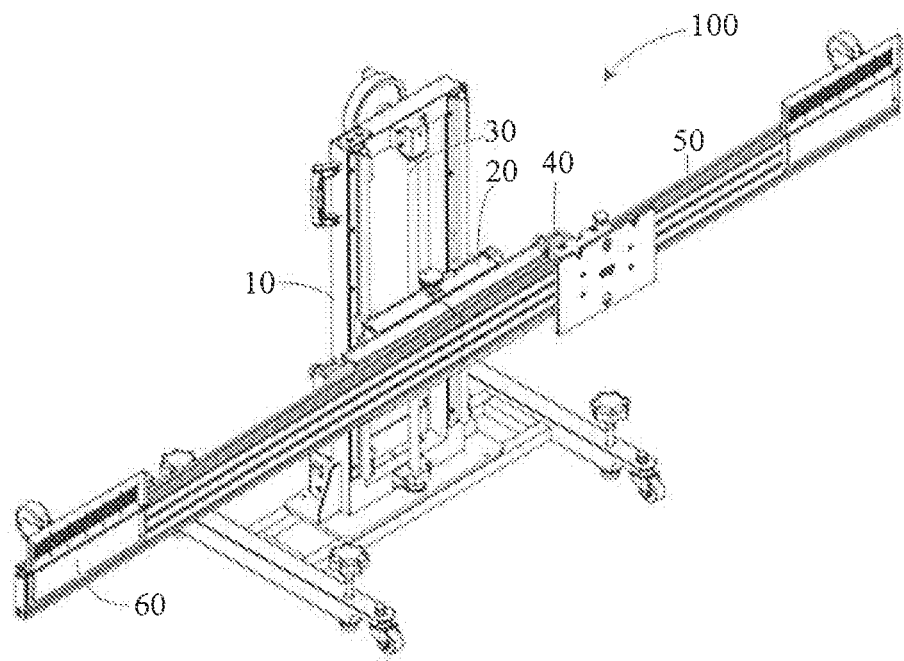
FIG. 1 is a schematic structural view of an automobile calibration device according to one embodiment of the present invention.
Figure 2:
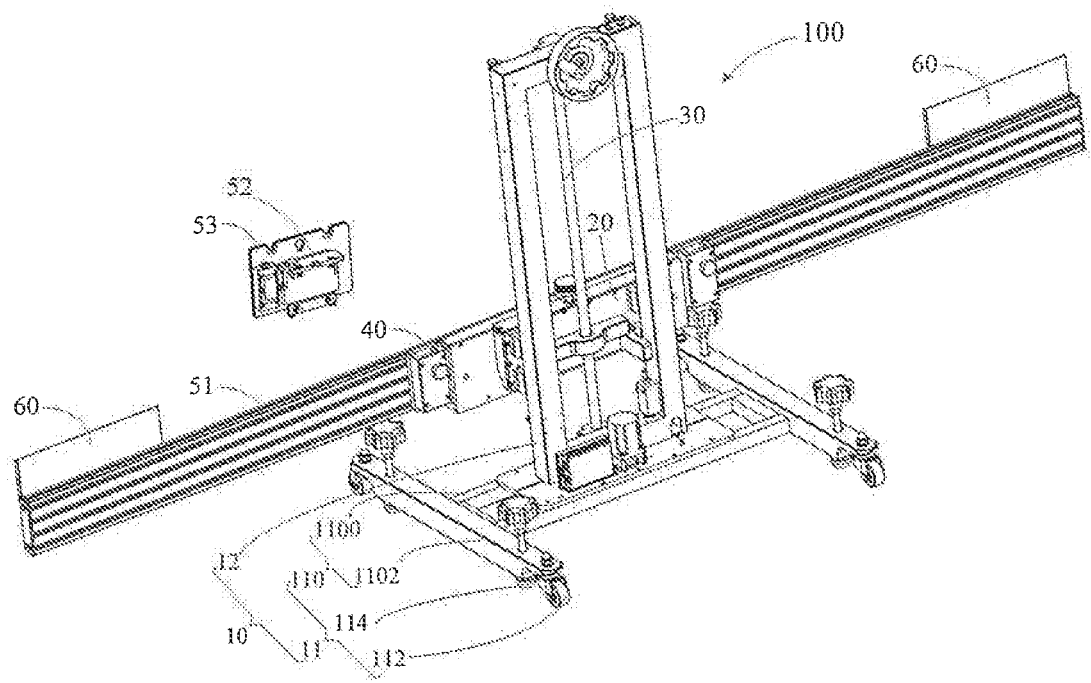
FIG. 2 is a schematic structural view of the automobile calibration device shown in FIG. 1 from another angle.

Referring to FIG. 1, in an embodiment, an automobile calibration device 100 includes a stand apparatus 10, a position adjustment apparatus 20, a drive assembly 30, a clamping apparatus 40, a slide apparatus 50 and a scale apparatus 60. The position adjustment apparatus 20 is mounted at the stand apparatus 10. The position adjustment apparatus 20 is movable in a vertical direction with respect to the stand apparatus 10. The drive assembly 30 is connected to the stand apparatus 10 and the position adjustment apparatus 20. The drive apparatus 30 is configured to drive the position adjustment apparatus 20 to move in the vertical direction with respect to the stand apparatus 10. The clamping apparatus 40 is mounted at the position adjustment apparatus 20 and is configured to clamp a vehicle calibration apparatus, for example, a calibration apparatus configured to calibrate a lane keeping system. The slide apparatus 50 is mounted at the position adjustment apparatus 20 through the clamping apparatus 40. The slide apparatus 50 can be horizontally moved with respect to the position adjustment apparatus 20. The scale apparatus 60 is mounted at the slide apparatus 50 and is configured to assist with calibration of the centerline of a vehicle. Referring to FIG. 2, the stand apparatus 10 includes a base support 11 and a vertical support 12. An end of the vertical support 12 is connected to the base support 11 and the base support 11 supports the vertical support 12.

The base support 11 includes a base support body 110, a roller 112 and a height adjustment member 114. The base support body 110 approximately has an "I" shape and includes a bearing structure 1100 and two lateral beams 1102. A plurality of hollow regions is formed in the bearing structure 1100 for a lighter weight. Two ends of the bearing structure 1100 are respectively connected to one lateral beam 1102.

The roller 112 is mounted at the bottom surface of the lateral beam 1102 and is configured to facilitate the movement of the base support 11. In this embodiment, the roller 112 is an omnidirectional roller to enable the base support 11 to move in any direction. There are four rollers 112. One roller 112 is disposed at each of two ends of each lateral beam 1102. It may be understood that, in some other embodiments, the shape of the base support body 110 may be changed according to an actual requirement, but is not limited to the "I" shape. For example, the base support body 110 may be rectangular. The quantity of the rollers 112 may be increased or reduced according to an actual requirement, provided that there are at least three rollers 112.

The height adjustment member 114 is mounted at the lateral beam 1102 and is configured to adjust the height of the base support body 110. In this embodiment, the height adjustment member 114 is an adjustment handwheel and there are four adjustment handwheels. The four adjustment handwheels 114 are distributed in a rectangular form. One adjustment handwheel 114 is provided at each of two ends of each lateral beam 1102. The four adjustment handwheels 114 are combined to adjust the overall horizontal height and tilt angle of the base support body 110. It may be understood that, the height adjustment member 114 may be another apparatus that can adjust height. The quantity of the height adjustment members 114 may be increased according to an actual requirement, provided that there are at least three height adjustment members 114.

Figure 3:
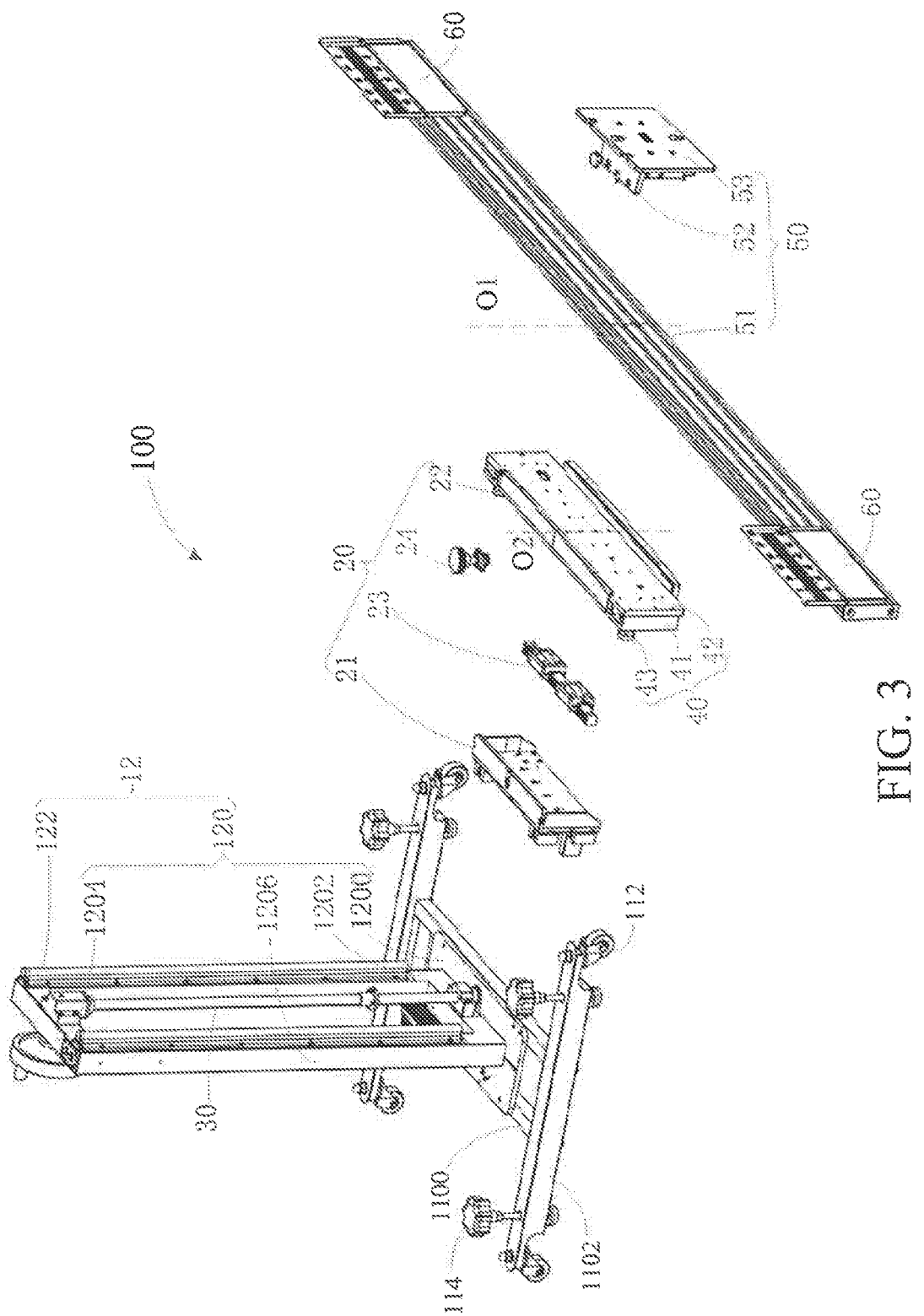
FIG. 3 is an exploded view of the automobile calibration device shown in FIG. 1.

Referring to FIG. 3, the vertical support 12 is mounted on the upper surface of the bearing structure 1100 and includes a vertical support body 120 and an elevation guiderail 122 mounted at the vertical support body 120.

The vertical support body 120 includes a mounting plate 1200, a mounting groove body 1202, a top beam 1204 and two vertical beams 1206. The mounting plate 1200 is mounted at the upper surface of the bearing structure 1100. A maintenance opening 1208 (see FIG. 7) is provided in the mounting plate 1200. The mounting groove body 1202 is inserted in the upper surface of the mounting plate 1200 and the maintenance opening 1208 is in communication with the mounting groove body 1202. Both the top beam 1204 and the two vertical beams 1206 have hollow structures. One end of each vertical beam 1206 is connected to the top beam 1204 and the other end of each vertical beam 1206 is connected to the mounting groove body 1202. The mounting groove body 1202, the top beam 1204 and the two vertical beams 1206 form a rectangular frame structure. The mounting groove body 1202, the top beam 1204 and the two vertical beams 1206 are internally in communication with each other to form a wiring groove structure (not shown). A wiring opening (not shown) is provided in the mounting groove body 1202. The wiring opening is in communication with the wiring groove structure.

Two elevation guiderails 122 are respectively mounted at the two vertical beams 1206. The elevation guiderail 122 is configured to guide the position adjustment apparatus 20 to move in the vertical direction. The elevation guiderail 122 is a vertical rod and is disposed in the vertical direction. The two elevation guiderails 122 are disposed in the vertical direction at a preset distance from each other. Each elevation guiderail 122 is mounted at a lateral surface of one corresponding vertical beam 1206. It may be understood that, in some other embodiments, the quantity of the elevation guiderail 122 may be increased or reduced according to an actual case. For example, there may be one elevation guiderail 122 or three elevation guiderails 122.

The position adjustment apparatus 20 is movably mounted at the two elevation guiderails 122 and is movable in the vertical direction with respect to the two elevation guiderails 122. The position adjustment apparatus 20 includes a slide member 21, a supporting member 22, a connection assembly 23 and an adjustment member 24. The slide member 21 is movably mounted at the elevation guiderail 122 and can move in the vertical direction with respect to the elevation guiderail 122. The supporting member 22 is mounted at the slide member 21 via the connection assembly 23. The supporting member 22 is movable in a horizontal direction with respect to the slide member 21. The supporting member 22 is configured to support the clamping apparatus 40. In some embodiments, the calibration apparatus can be directly mounted on the supporting member 22, i.e. the clamping apparatus 40 is not necessary for the automobile calibration device. In some other embodiments, the clamping apparatus 40 may be mounted at other location, such as mounted on the guiderail 51. The adjustment member 24 is connected to the slide member 21 and the slide member 21 and is configured to adjust the horizontal position of the supporting member 22. It can be understood that in some embodiments, the supporting member 22 is not necessary to be movable in the horizontal direction, and thus the slide member 21, the connection assembly 23 and the adjustment member 24 can be emitted from the automobile calibration device 100, in this case, the supporting member 22 directly mounted with the vertical support 12, the supporting member 22 includes mounting mechanism such as the ones included by the slide member 21; or the supporting member 22, the connection assembly 23 and the adjustment member 24 can be emitted from the automobile calibration device 100, in this case, the slide member 24 directly mounted with the guiderail 51.

Figure 4:
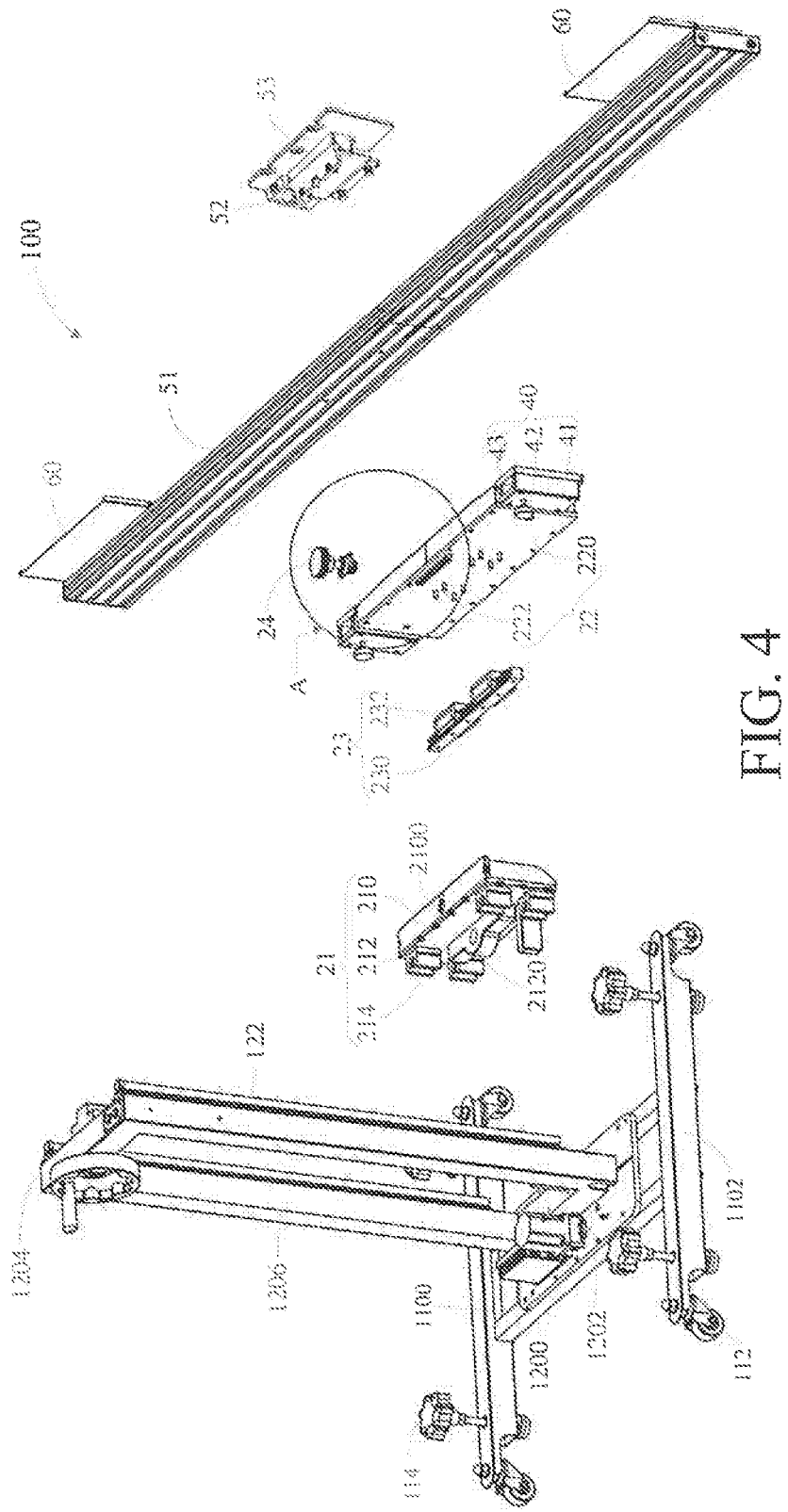
FIG. 4 is an exploded view of the automobile calibration device shown in FIG. 1 from another angle.
Figure 5:
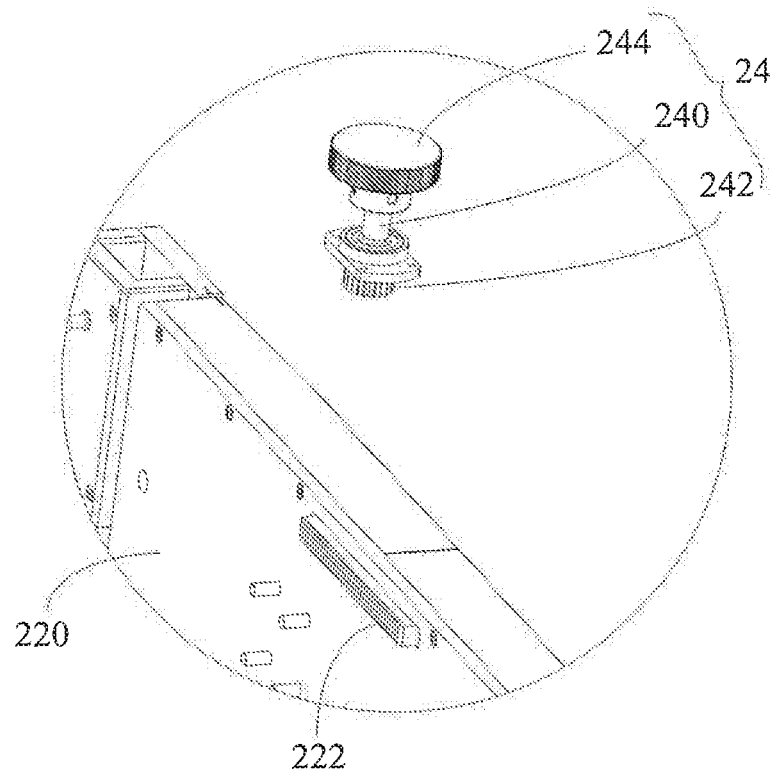
FIG. 5 is a partial enlarged view of a part A in FIG. 4.

Referring to FIG. 4 and FIG. 5 together, the slide member 21 includes a slide member body 210, a slide block 212 and a guide block 214. The slide member body 210 is approximately cubical. A mounting through hole 2100 is optionally opened in the slide member body 210. The mounting through hole 2100 is configured to mount the adjustment member 24. The slide block 212 is fixedly mounted at the slide member body 210. A threaded through hole 2120 is opened in the slide block 212. The central axis of the threaded through hole 2120 is disposed vertically. The guide block 214 is fixedly mounted at the slide member body 210. The guide block 214 and the slide block 212 are located on a same side of the slide member body 210. There are four guide blocks 214. Two guide blocks 214 are located on one side of the slide block 212, are arranged in the vertical direction and are sleeved over one elevation guiderail 122. The other two guide blocks 214 are located on the other side of the slide block 212, are also arranged in the vertical direction and are sleeved over the other elevation guiderail 122. Every two guide blocks 214 are sleeved over one corresponding elevation guiderail 122 to enable the position adjustment apparatus 20 to stably slide along the elevation guiderail 122 in the vertical direction with respect to the elevation guiderail 122.

It may be understood that, in some other embodiments, the quantity of the guide blocks 214 may be changed according to an actual requirement, but is not limited to four, provided that there are at least one guide block 214. For example, there is one guide block 214, there is also one elevation guiderail 122 and the one guide block 214 is sleeved over the one elevation guiderail 122. For another example, there are two guide blocks 214, the two guide blocks 214 are respectively disposed at two opposite sides of the slide block 212, there are also two elevation guiderails 122 and each guide block 214 is sleeved over one corresponding elevation guiderail 122.

The supporting member 22 is movably mounted at the slide member body 210 and is horizontally movable with respect to the slide member body 210. The supporting member 22 includes a supporting member body 220 and a rack 222. The supporting member body 220 is approximately cubical. The rack 222 is fixedly mounted at the supporting member body 220. The rack 222 is disposed between the supporting member body 220 and the slide member body 210 and is configured to fit with the adjustment member 24 to adjust the horizontal position of the supporting member 22. The rack 222 has a bar shape, is disposed in the horizontal direction and includes a plurality of gear teeth disposed in the vertical direction.

The connection assembly 23 includes a linear slide rail 230 and a slide rail fixing block 232. The linear slide rail 230 is disposed in the horizontal direction and is fixedly mounted at the slide member body 210. Two slide rail fixing blocks 232 are fixedly mounted at the supporting member body 220 and the two slide rail fixing blocks 232 are arranged in the horizontal direction. The two slide rail fixing blocks 232 are sleeved over the linear slide rail 230. The linear slide rail 230 is slidable in the horizontal direction with respect to the slide rail fixing block 232.

In this embodiment, the supporting member 22 is mounted at the slide member 21 via the connection assembly 23, so that the supporting member 22 is movably mounted at the slide member 21, that is, the supporting member 22 is movable with respect to the slide member 21. It may be understood that, in some other embodiments, the supporting member 22 may be movably mounted at the slide member 21 in another connection manner, provided that the supporting member 22 is movable in the horizontal direction with respect to the slide member 21. For example, a worm-gear mechanism or a belt-gear mechanism is used.

It may be understood that, in some other embodiments, the mounting positions of the linear slide rail 230 and the slide rail fixing block 232 are interchangeable. To be specific, the linear slide rail 230 is disposed in the horizontal direction and is fixedly mounted at the supporting member body 220. The two slide rail fixing blocks 232 are fixedly mounted at the slide member body 210. The two slide rail fixing blocks 232 are sleeved over the linear slide rail 230.

It may be understood that, in some other embodiments, the quantity of the slide rail fixing blocks 232 is not limited to two and may be changed according to an actual requirement, provided that there is at least one slide rail fixing block 232. For example, there is one slide rail fixing block 232.

The adjustment member 24 includes a rod body 240, a gear 242 and a knob portion 244. The rod body 240 passes through the mounting through hole 2100, the rod body 240 is movably mounted at the slide member body 210 and the rod body 240 is rotatable with respect to the slide member body 210. The gear 242 and the knob portion 244 are respectively mounted at two ends of the rod body 240. The gear 242 is meshed with the rack 222. When the rod body 240 rotates with respect to the slide member body 210, the gear 242 drives the rack 222 to move horizontally, to enable the supporting member 22 to move horizontally with respect to the slide member 21. The knob portion 244 is located outside the slide member body 210 and is configured to assist a user in holding and rotating the adjustment member 24.

It may be understood that, in some other embodiments, the mounting positions of the adjustment member 24 and the rack 222 are interchangeable. To be specific, the adjustment member 24 may be mounted at the supporting member body 220. The rack 222 is fixedly mounted at the slide member body 210. The rack 222 is disposed in the horizontal direction.

In this embodiment, the linear slide rail 230 is disposed in the horizontal direction. The rack 222 has a bar shape, is disposed in the horizontal direction and includes a plurality of gear teeth disposed vertically. The gear 242 is a spur gear. These structures enable the supporting member 22 to move in the horizontal direction with respect to the slide member 21. It may be understood that, in some other embodiments, according to an actual requirement, the linear slide rail 230 may be disposed in a preset direction and the two slide rail fixing blocks 232 are arranged in the preset direction. The linear slide rail 230 is slidable in the preset direction with respect to the slide rail fixing blocks 232. The rack 222 has a bar shape and is disposed in the preset direction, so that when rotating, the gear 242 can drive the rack 222 to move in the preset direction, to enable the supporting member 22 to move in the preset direction with respect to the slide member 21.

In this embodiment, the gear 242 is a spur gear and the rack 222 includes a plurality of gear teeth disposed in the vertical direction. By means of the gear engagement between the gear 242 and the rack 222, the supporting member 22 can stably and precisely move horizontally with respect to the slide member 21. It may be understood that, in some other embodiments, the gear 242 may be a helical gear and the rack 222 may include a plurality of slanted gear teeth. By means of the gear engagement between the gear 242 and the rack 222, the supporting member 22 can move horizontally with respect to the slide member 21.

In some embodiments, a supporting assembly includes the position adjustment apparatus 20, the slide apparatus 50 and a scale apparatus 60. The supporting assembly may include part of individual structures of each apparatus, and the parts of individual structures of each apparatus are combined together to form the supporting assembly. For example, the supporting assembly includes the slide member 21 of the position adjustment apparatus 20, and the guiderail 51 of the slide apparatus 50. The slide member 21 and the guiderail 51 may be fixedly mounted. Or, the guiderail 51 may move horizontally with respect to the slide member 21 by the assistant of the supporting member 22 or other slidable mechanism. The structure of the slide member 21 or the guiderail 51 may exist other implementations besides the structure described and shown. Optionally, the supporting assembly also includes at least one of the clamping apparatus 40 and the scale apparatus 60.

Figure 6:
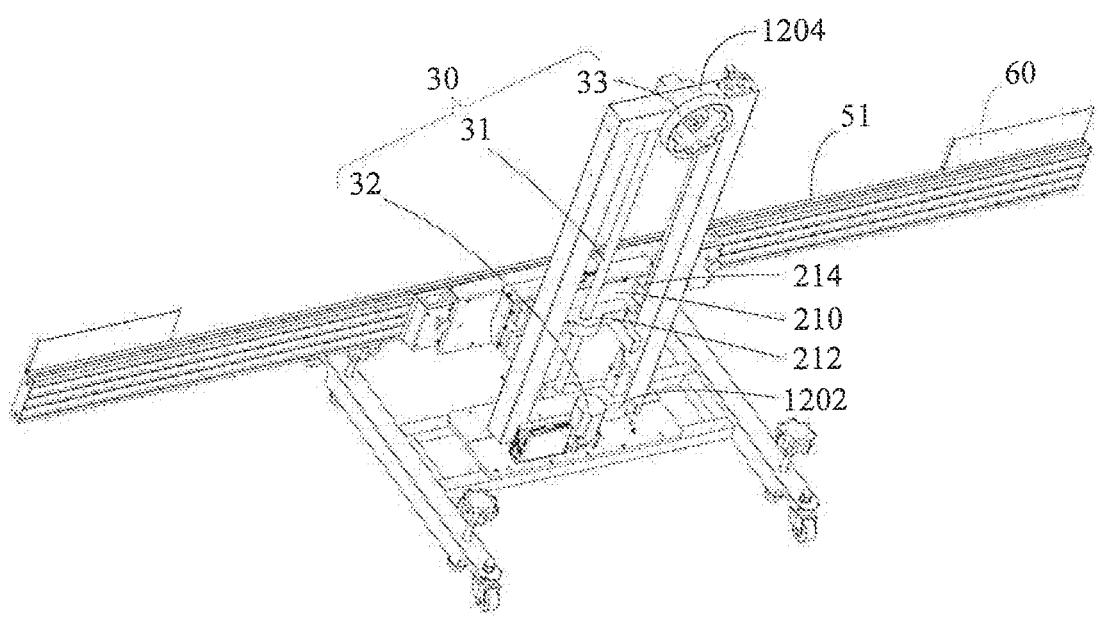
FIG. 6 is a schematic structural view of the automobile calibration device shown in FIG. 1, where a slide assembly and a hanging assembly of the automobile calibration device are omitted.

Referring to FIG. 6, the drive assembly 30 includes a transmission mechanism 31, a first drive mechanism 32. Optionally, the drive apparatus 30 may also include a second drive mechanism 33. The first drive mechanism 32 and the second drive mechanism 33 are both connected to the transmission mechanism 31. The first drive mechanism 32 is configured to drive the transmission mechanism 31 to move via electrical manner. The second drive mechanism 33 is also configured to drive the transmission mechanism 31 to move via manual operation. The transmission mechanism 31 is configured to enable the position adjustment apparatus 20 to move in the vertical direction with respect to the stand apparatus 10.

Figure 7:
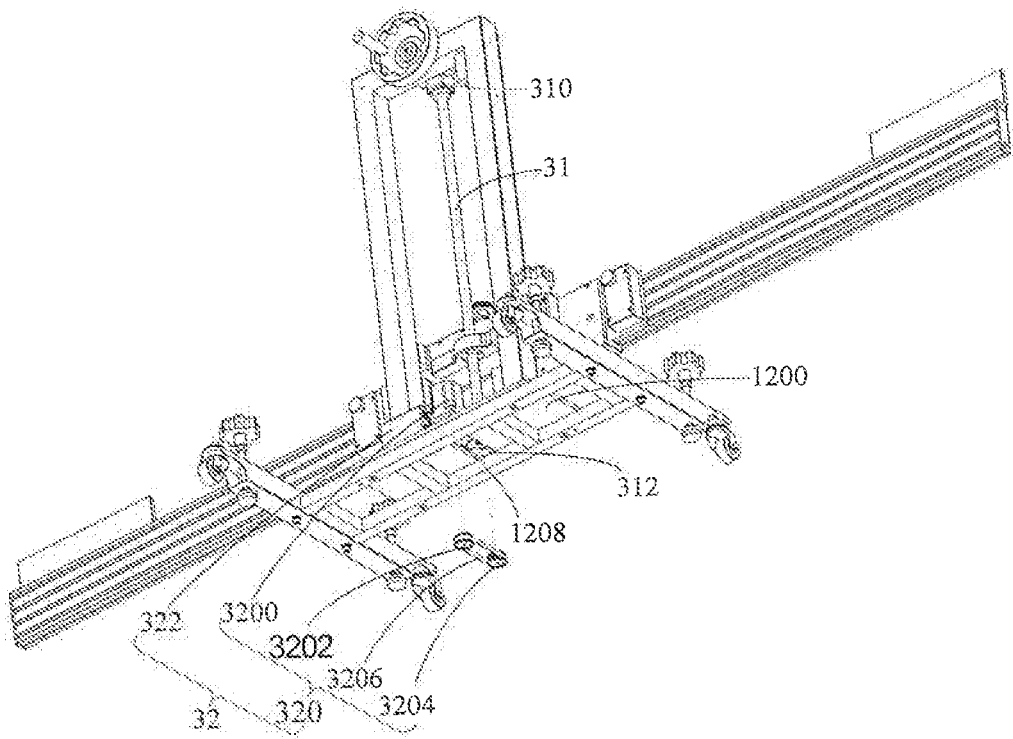
FIG. 7 is a schematic structural view of the automobile calibration device shown in FIG. 1 from another angle, where a slide assembly and a hanging assembly of the automobile calibration device are omitted.
Figure 8:
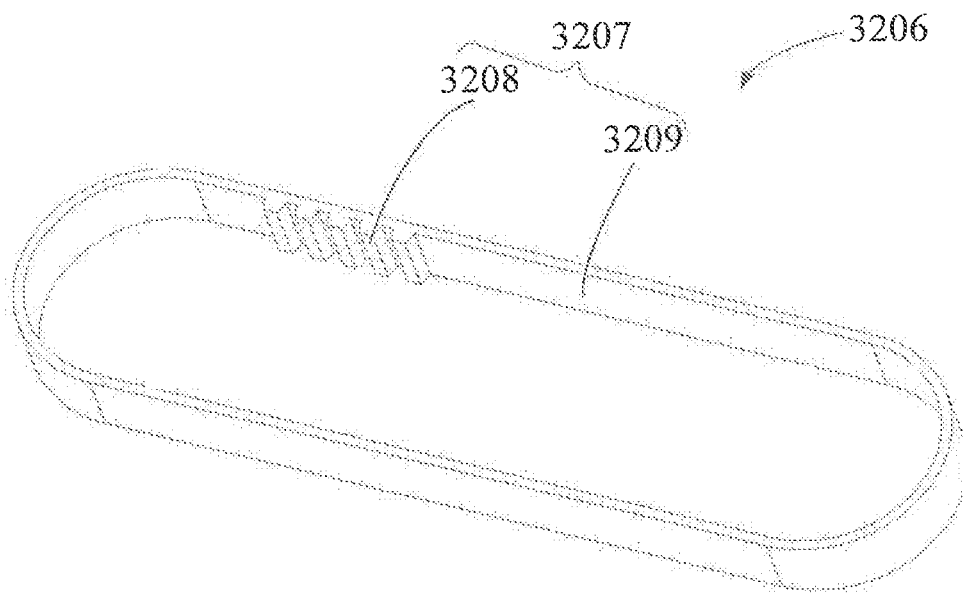
FIG. 8 is a schematic structural view of a drive belt of a motor assembly of the automobile calibration device shown in FIG. 7.

Referring to FIG. 7 and FIG. 8 together, in this embodiment, the transmission mechanism 31 is an elevation screw rod 31. A first shaft seat 310 and a second shaft seat 312 are respectively disposed at two ends of the elevation screw rod 31. The first shaft seat 310 is fixedly mounted at the top beam 1204. The second shaft seat 312 is fixedly mounted at the mounting groove body 1202. The elevation screw rod 31 is disposed vertically. The elevation screw rod 31 is rotatable around the central axis of the elevation screw rod 31. The elevation screw rod 31 passes through the threaded through hole 2120. The elevation screw rod 31 is threaded to the threaded through hole 2120. When the elevation screw rod 31 rotates around the central axis of the elevation screw rod 31, the elevation screw rod 31 can drive the slide block 212 to ascend or descend, to enable the position adjustment apparatus 20, the clamping apparatus 40, the slide apparatus 50 and the scale apparatus 60 to ascend or descend. It should be noted that the elevation screw rod 31 is threaded to the threaded through hole 2120, so that in one aspect, the position adjustment apparatus 20 ascends or descends smoothly and stably, and in another aspect, because the position adjustment apparatus 20 has a particular mass, the elevation screw rod 31 and the threaded through hole 2120 implement a self-locking function to automatically prevent the position adjustment apparatus 20 from sliding downwards.

It may be understood that, according to an actual case, a transmission mechanism 31 is not only limited to the elevation screw rod 31. In some other embodiments, the transmission mechanism 31 may be alternatively a gear set, a belt-gear mechanism, a worm-gear mechanism, a chain-gear mechanism or the like.

It may be understood that, the slide member 21 and the connection assembly 23 for bearing the supporting member 22 may be omitted. That is, the slide block 212 and the guide block 214 may be mounted at the supporting member 22, so that the supporting member 22 is directly mounted at the elevation screw rod 31 and the elevation guiderail 122 and the supporting member 22 is mounted at the stand apparatus 10 and is movable in the vertical direction with respect to the stand apparatus 10. A trigger apparatus 3229 below may also be directly mounted at the supporting member 22. The trigger apparatus 3229 can trigger a limit switch 3225 below when the supporting member 22 moves in the vertical direction.

It may be understood that the structure of the stand apparatus is not limited herein, the stand apparatus is just required to support the transmission mechanism, so shat the transmission mechanism may bring along with the support member 22 to move in the vertical direction.

The first drive mechanism 32 is an electrical drive mechanism and is configured to drive the elevation screw rod 31 to rotate around the central axis of the elevation screw rod 31. The first drive mechanism 32 includes a motor assembly 320 and a power supply assembly (not shown). The motor assembly 320 is configured to drive the elevation screw rod 31 to rotate around the central axis of the elevation screw rod 31. The motor assembly 320 may comprise a motor 3200 and a control assembly 322. The control assembly 322 is configured to control the motor 3200, such as to control the rotation status of the motor 3200, the rotation status may include rotation speed of the motor 3200. The power supply assembly is configured to supply power to the motor assembly 320.

The motor 3200 is fixedly mounted at the upper surface of the mounting plate 1200. The position of the motor 3200 can be relative to the position of the transmission mechanism 31, like the motor 3200 can be mounted on the other locations such as the vertical beam 1206 of the vertical support 12, or the position of the motor 3200 can be set according to actual demands. The motor 3200 is a step motor. It may be understood that, in some other embodiments, the motor 3200 may be another control motor, for example, a servo motor.

In some embodiments, the motor 3200 may directly drive the transmission mechanism 31, or the motor 3200 may connect with the transmission mechanism 31 through a connection mechanism.

In some embodiments, the motor 3200 and the transmission mechanism such as an elevation screw rod 31 may be integrated as a Linear Actuator. For other implementation of the transmission mechanism, the motor 3200 can use the rotation of itself to drive the transmission mechanism to move.

In some other embodiments, if the motor 3200 needs to connect with the transmission mechanism 31 through a connection mechanism. The connection mechanism may include a first synchronous gear 3202, a drive belt 3206 and a second synchronous gear 3204.

The first synchronous gear 3202 is located in the maintenance opening 1208. The first synchronous gear 3202 is fixedly mounted at a rotating shaft of the motor 3200 and the first synchronous gear 3202 and the rotating shaft of the motor 3200 are disposed coaxially. An end of the elevation screw rod 31 passes through the second shaft seat 312 and the maintenance opening 1208. The second synchronous gear 3204 is located in the maintenance opening 1208. The second synchronous gear 3204 is fixedly mounted at the elevation screw rod 31. The second synchronous gear 3204 and the elevation screw rod 31 are disposed coaxially. The first synchronous gear 3202 and the second synchronous gear 3204 are disposed at a preset distance from each other. When the motor 3200 rotates, the first synchronous gear 3202 drives the second synchronous gear 3204 through the drive belt 3206 to rotate, to enable the elevation screw rod 31 to rotate around the central axis of the elevation screw rod 31. When the motor 3200 rotates in a first rotational direction, the position adjustment apparatus 20 ascends in the vertical direction with respect to the stand apparatus 10. When the motor 3200 rotates in a second rotational direction, the position adjustment apparatus 20 descends in the vertical direction with respect to the stand apparatus 10. The first rotational direction and the second rotational direction are opposite.

The drive belt 3206 is sleeved over the first synchronous gear 3202 and the second synchronous gear 3204. When the first synchronous gear 3202 rotates, the first synchronous gear 3202 drives the second synchronous gear 3204 through the drive belt 3206 to rotate. A peripheral surface of the first synchronous gear 3202 and a peripheral surface of the second synchronous gear 3204 are both provided with gear teeth. The drive belt 3206 includes an assembly surface 3207. The gear teeth of the first synchronous gear 3202 and the gear teeth of the second synchronous gear 3204 are both in contact with the assembly surface 3207. The assembly surface 3207 includes a toothed area 3208 and a non-toothed area 3209. The toothed area 3208 is provided with gear teeth. The toothed area 3208 may be meshed with the first synchronous gear 3202 and the second synchronous gear 3204. The non-toothed area 3209 may be in contact with the first synchronous gear 3202 and the second synchronous gear 3204. When the motor 3200 rotates and the toothed area 3208 is meshed with the first synchronous gear 3202 or the toothed area 3208 is meshed with the second synchronous gear 3204, the first synchronous gear 3202 and the second synchronous gear 3204 move synchronously and a rate of the second synchronous gear 3202 is a first preset rate value. When the motor 3200 rotates and the first synchronous gear 3202 and the second synchronous gear 3204 are only in contact with the non-toothed area 3209, due to skidding or the like of the non-toothed area 3209, the first synchronous gear 3202 and the second synchronous gear 3204 move asynchronously and a rate of the second synchronous gear 3202 is a second preset rate value. The first preset rate value is greater than the second preset rate value. It should be noted that, the assembly surface 3207 is divided into the toothed area 3208 and the non-toothed area 3209, so that while the rate of the first synchronous gear 3202 is kept unchanged, the rate of the second synchronous gear 3204 is controlled, thereby achieving rate reduction.

Figure 9:
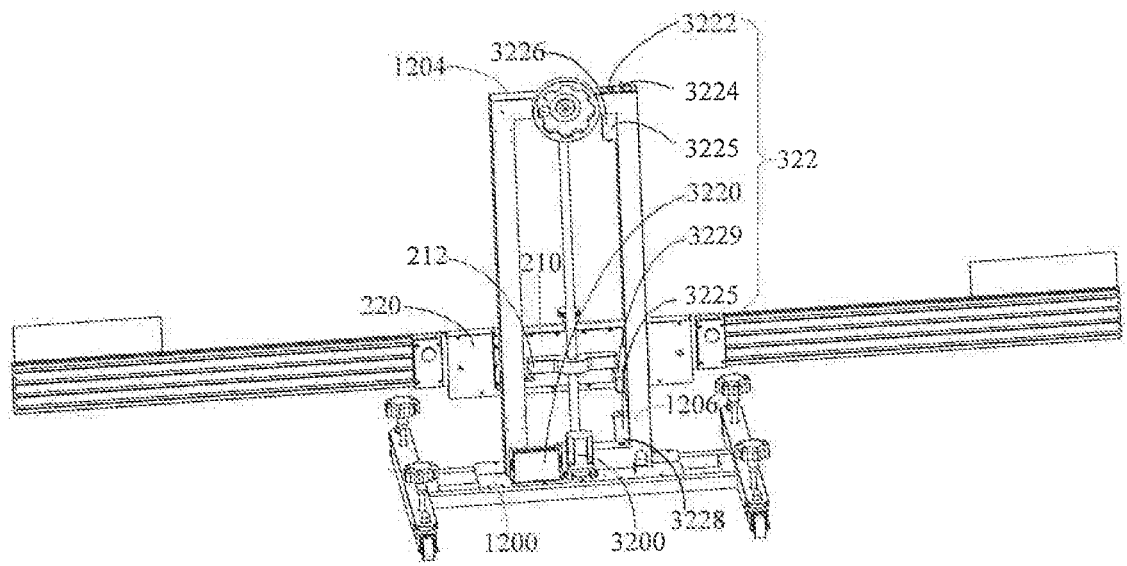
FIG. 9 is a schematic structural view of still another angle of the automobile calibration device shown in FIG. 1, where a slide assembly and a hanging assembly of the automobile calibration device are omitted.

Referring to FIG. 9, the control assembly 322 includes a controller 3220, an ascending button 3222, a descending button 3224, the limit switch 3225 and the trigger apparatus 3229. Optionally, the control assembly 322 includes a stop button. The control assembly 322 may also include other electrical elements, which may not be limited herein. The controller 3220 is electrically connected to the ascending button 3222, the descending button 3224 and the limit switch 3225. The controller 3220 is configured to control the motor 3200. The ascending button 3222, the descending button 3224, the stop button and the limit switch 3225 are respectively configured to send signals to the controller 3220, and the controller may detect the button or switch has been triggered, so as to generate a corresponding instruction according to a signal sent by a button or a switch, the corresponding instruction may be used to control the rotation of the motor 3200. The controller may be implemented as a printed circuit board (PCB) or an integrated circuit or any other implementations, the controller can be implemented by hardware or software or the combination of the both. The control assembly 322 may also include a trigger apparatus 3229. The trigger apparatus 3229 is configured to trigger the limit switch 3225 to prevent the supporting assembly from moving out of the present range. The trigger apparatus 3229 has a plate-form structure. The trigger apparatus 3229 is mounted at the slide member body 210 and the trigger apparatus 3229 and the slide block 212 may be located on a same side of the slide member body 210. The trigger apparatus 3229 may be located in other positions on the stand apparatus, the location of the trigger apparatus 3229 may be set according to the limitation movement range of the supporting assembly. The trigger apparatus 3229 may be set on top and/or bottom area of the stand apparatus, so that the supporting member may be avoided from damage in case of an unappropriated operation. The trigger apparatus 3229 includes a sensor, the sensor can detect the connection with the supporting member, once the sensor detects the connection with the supporting member, the sensor may send a signal to the limit switch, to control the open or close status of the limit switch, or the sensor detects the connection degree reaches to a certain level, the sensor sends a signal to the limit switch. There are a lot of implementations of the sensor to be able to detect the connection or a connection level or to detect the relative distance between the sensor and the supporting assembly, the connection level may be pressure between the supporting member and the trigger apparatus 3229 or the like. The sensor may be a visual capture, a distance sensor, etc. . . . . The implementation of the sensor will not be limited herein.

In some other embodiments, the trigger apparatus may not be necessary for detecting the connection with the supporting assembly. For example, the limit switch can be set with a button, when the button is pressed by the supporting assembly, the limit switch can be triggered.

The limit switch 3225 is mounted at the vertical beam 1206 and the limit switch 3225 is located above or below the trigger apparatus 3229. Or, the limit switch 3225 can be set close to the trigger apparatus. The ascending button 3222 and the descending button 3224 are both mounted at the top beam 1204. The controller 3220 is mounted at the upper surface of the mounting plate 1200. The ascending button 3222, the descending button 3224 and the limit switch 3225 are all electrically connected to the controller 3220 through a wire bundle (not shown). The wire bundle is disposed in the wiring groove structure and passes through the wiring opening to be connected to the controller 3220.

Optionally, the ascending button 3222, the descending button 3224 and the stop button are set together for user convenience. Optionally, there is a general button to realize ascending, descending or stopping the motor rotation. The general button is used to send different signals to indicate different instructions to the controller 3220. The controller can analyze an instruction from the general button to determine whether to ascend, descend or stop the motor rotation.

The controller 3220 includes a drive (not shown) and an elevation control panel (not shown). The elevation control panel is connected to the drive. The drive is connected to the motor 3200. The drive is configured to control the motor 3200, for example, control the start/stop, the rotational speed, the rotational direction and the like of the motor 3200. The ascending button 3222, the descending button 3224, an ascending limit switch 3226 and a descending limit switch 3228 are all electrically connected to the elevation control panel. The ascending button 3222, the descending button 3224, the ascending limit switch 3226 and the descending limit switch 3228 are all configured to control the elevation control panel.

When the ascending button 3222 is triggered, the controller 3220 is configured to control the motor 3200 to rotate along the first rotational direction. When the descending button 3224 is triggered, the controller 3220 is configured to control the motor 3200 to rotate in the second rotational direction. When the ascending button 3222 and the descending button 3224 are triggered simultaneously, or if there is a stop button, when the stop button is triggered, the controller 3220 is configured to control the motor 3200 to stop rotation. It should be noted that, because the ascending button 3222 and the descending button 3224 need to be set together to facilitate operation and a misoperation is likely to occur. When the ascending button 3222 and the descending button 3224 are triggered simultaneously or neither the ascending button 3222 or the descending button 3224 is triggered, the controller 3220 is configured to control the motor 3200 to stop rotation to protect the motor 3200 from damage caused by short circuiting.

When the limit switch 3225 is triggered, the controller 3220 is configured to control the motor 3200 to stop rotation and the motor 3200 is controlled to rotate in only the preset direction which is opposite from the original direction, so that the trigger apparatus 3229 is far away from the limit switch 3225.

It may be understood that, there may be one or two limit switches 3225. In this embodiment, the limit switch 3225 includes the ascending limit switch 3226 and the descending limit switch 3228. The ascending limit switch 3226 and the descending limit switch 3228 are mounted on a same side of one vertical beam 1206. The ascending limit switch 3226 is located above the trigger apparatus 3229 and the descending limit switch 3228 is located below the trigger apparatus 3229.

When the ascending limit switch 3226 is triggered, the controller 3220 is configured to control the motor 3200 to stop rotation and control the motor 3200 to rotate in only the second rotational direction. When the descending limit switch 3228 is triggered, the controller 3220 is configured to control the motor 3200 to stop rotation and control the motor to rotate in only the first rotational direction. It should be noted that, the ascending limit switch 3226 and the descending limit switch 3228 are both set, so that the position adjustment apparatus 20 is automatically prevented from exceeding a maximum travel without manual intervention and the motor 3200 is set to rotate in a specified direction, so that the motor 3200 is protected from damage caused by short circuiting during a misoperation.

At the instant the motor 3200 starts to rotate, the controller 3220 is further configured to control the rate of the motor 3200 to increase linearly or non-linearly from 0 to a preset value.

The power supply assembly includes a DC socket, a power switch and a power indicator lamp. When a power adapter is plugged in the DC socket and the power switch is turned on, the power indicator lamp emits preset light such as red light and the controller 3220 and the motor 3200 may work.

Figure 10:
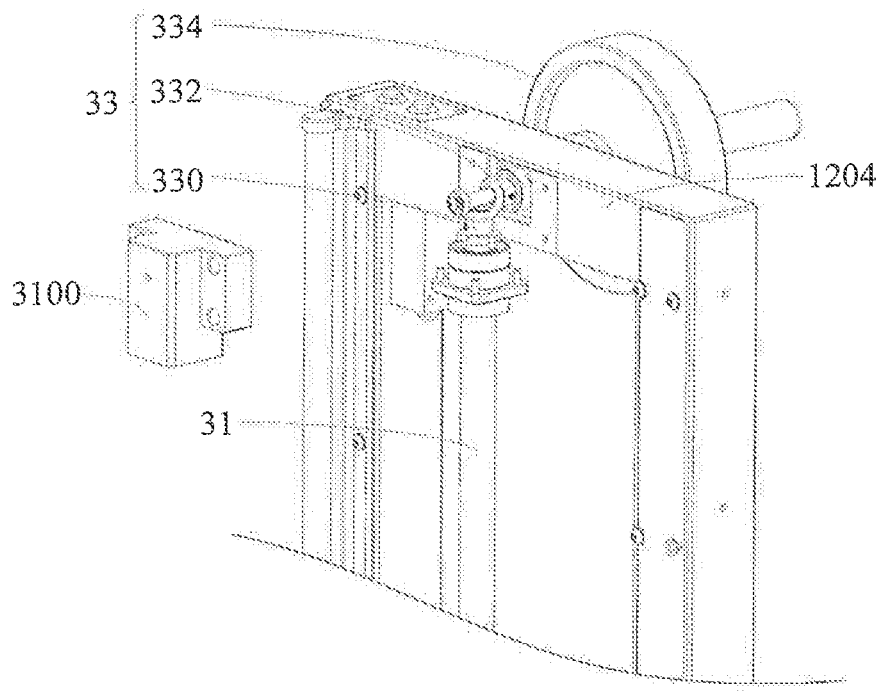
FIG. 10 is a partial schematic exploded view of the automobile calibration device shown in FIG. 1, where a first shaft seat is detached.

Referring to FIG. 10, the second drive mechanism 33 is a manual drive mechanism. The second drive mechanism 33 includes a first helical gear 330, a second helical gear 332 and an elevation handwheel 334. A connection rod (not shown) of the elevation handwheel 334 passes through the top beam 1204 and is accommodated in the first shaft seat 3100. The first helical gear 330 and the second helical gear 332 are both located in the first shaft seat 3100. The first helical gear 330 is fixedly mounted at the elevation screw rod 31. The first helical gear 330 and the elevation screw rod 31 are disposed coaxially. The second helical gear 332 is fixedly mounted at the connection rod of the elevation handwheel 334 and the second helical gear 332 and the connection rod of the elevation handwheel 334 are disposed coaxially. The first helical gear 330 is meshed with the second helical gear 332. The rotational axis of the elevation handwheel 334 is disposed horizontally. It should be noted that, the second drive mechanism 33 is disposed, so that in one aspect, when there is a power supply shortage, the automobile calibration device 100 can be used normally and in another aspect, the first drive mechanism 32 and the second drive mechanism 33 share one transmission mechanism 31 and the overall structure is compact. It may be understood that, in some other embodiments, an angle between the rotational axis of the elevation handwheel 334 and the horizontal plane may be set to any value according to an actual case.

In this embodiment, the drive assembly 30 is set in the automobile calibration device 100, so that the position adjustment apparatus 20, the clamping apparatus 40, the slide apparatus 50 and the scale apparatus 60 can automatically ascend or descend, thereby avoiding manual adjustment.

In addition, a transmission mechanism 31 is disposed to be the elevation screw rod 31 to fit with the threaded through hole 2120, so that the position adjustment apparatus 20 ascends or descends smoothly and the position adjustment apparatus 20 is prevented from sliding downwards easily.

Moreover, the first drive mechanism 32 and the second drive mechanism 33 are disposed, so that the automobile calibration device 100 can be used when there is a power supply shortage, thereby improving the applicability of the automobile calibration device 100. In addition, the first drive mechanism 32 and the second drive mechanism 33 share the same transmission mechanism 31, thereby improving the overall compactness of the automobile calibration device 100.

Finally, the assembly surface 3207 is divided into the toothed area 3208 and the non-toothed area 3209 and the rate of the second synchronous gear 3204 is controlled, thereby achieving rate reduction.

Figure 11:
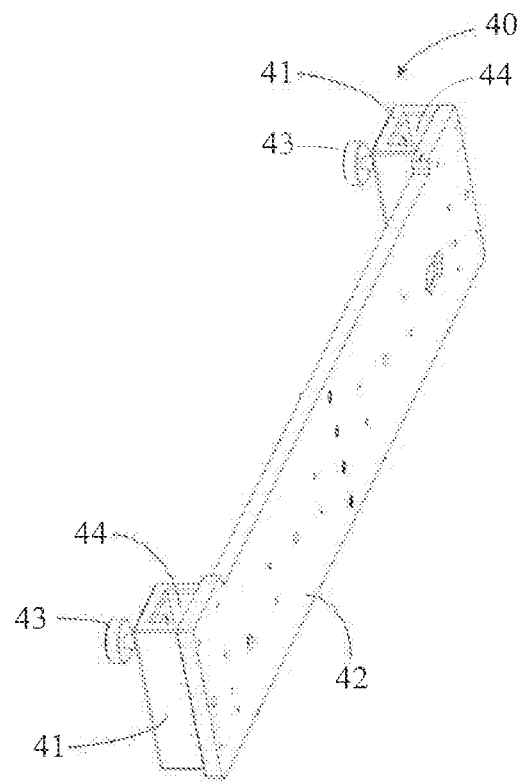
FIG. 11 is a schematic structural view of a clamping apparatus of the automobile calibration device shown in FIG. 1.
Figure 12:
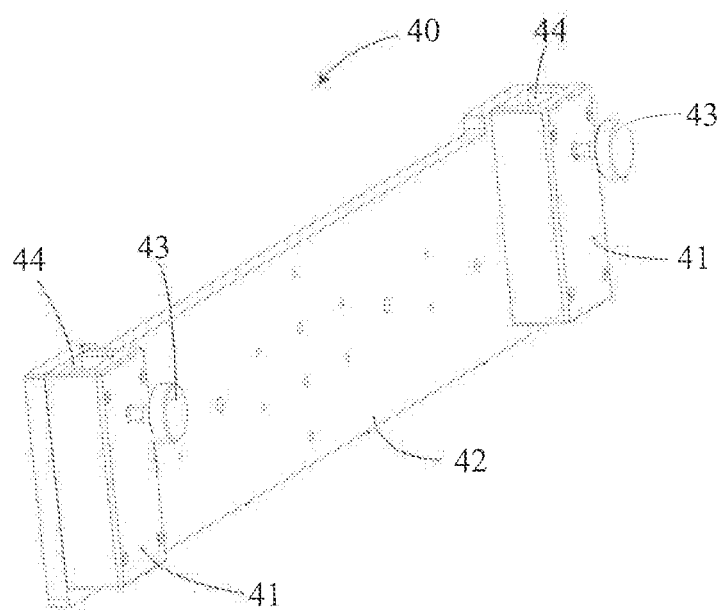
FIG. 12 is a schematic structural view of the clamping apparatus shown in FIG. 11 from another angle.

Referring to FIG. 11 and FIG. 12 together, the clamping apparatus 40 includes a fixing block 41, a fixing plate 42 and a tightening knob 43. The fixing block 41 is fixedly mounted at the fixing plate 42. The fixing block 41 and the fixing plate 42 enclose an accommodating cavity 44. The accommodating cavity 44 is configured to accommodate a fixing rod of a calibration apparatus. The tightening knob 43 is mounted at the fixing block 41 and the tightening knob 43 is rotatable with respect to the fixing block 41 to extend into the accommodating cavity 44 to abut the fixing rod of the calibration apparatus inserted in the accommodating cavity 44.

Figure 13:
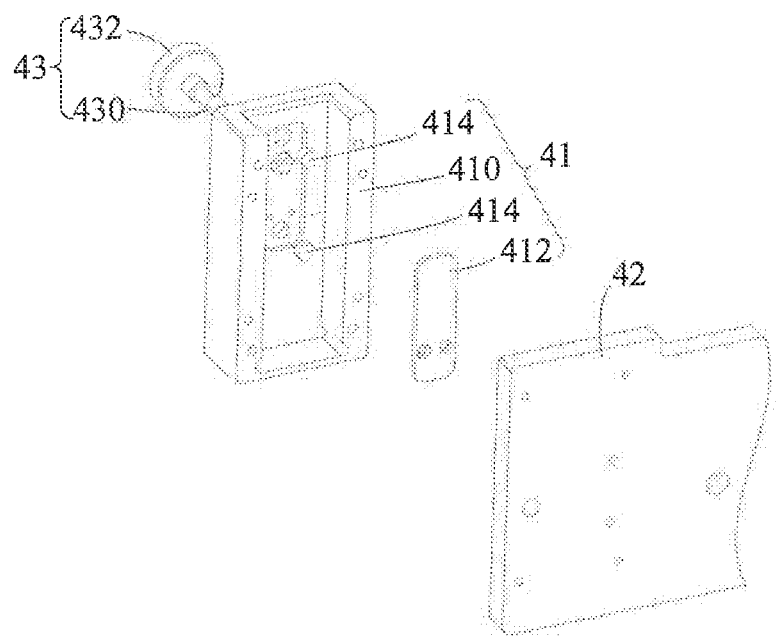
FIG. 13 is an exploded view of the clamping apparatus shown in FIG. 11.

Referring to FIG. 13, the fixing block 41 includes a fixing block body 410, a locking elastic sheet 412 and a magnetic component 414. The fixing block body 410 is fixedly mounted at the fixing plate 42 and the fixing block body 410 and the fixing plate 42 enclose the accommodating cavity 44. The locking elastic sheet 412 is located in the accommodating cavity 44 and is pushed by the tightening knob 43 to abut the fixing rod of the calibration apparatus. The magnetic component 414 is fixedly mounted at the fixing block body 410 and the magnetic component 414 is located in the accommodating cavity 44. The magnetic component 414 is configured to attract the locking elastic sheet 412, to enable the locking elastic sheet 412 to leave the fixing rod of the calibration apparatus. In this embodiment, there are two magnetic components 414. The two magnetic components 414 are arranged in the vertical direction and the two magnetic components 414 are respectively located at two opposite ends of the locking elastic sheet 412, so that the locking elastic sheet 412 is forcefully and stably attracted. It may be understood that, in some other embodiments, the quantity of the magnetic components 414 may be changed according to an actual requirement, provided that there is at least one magnetic component 414.

Figure 14:
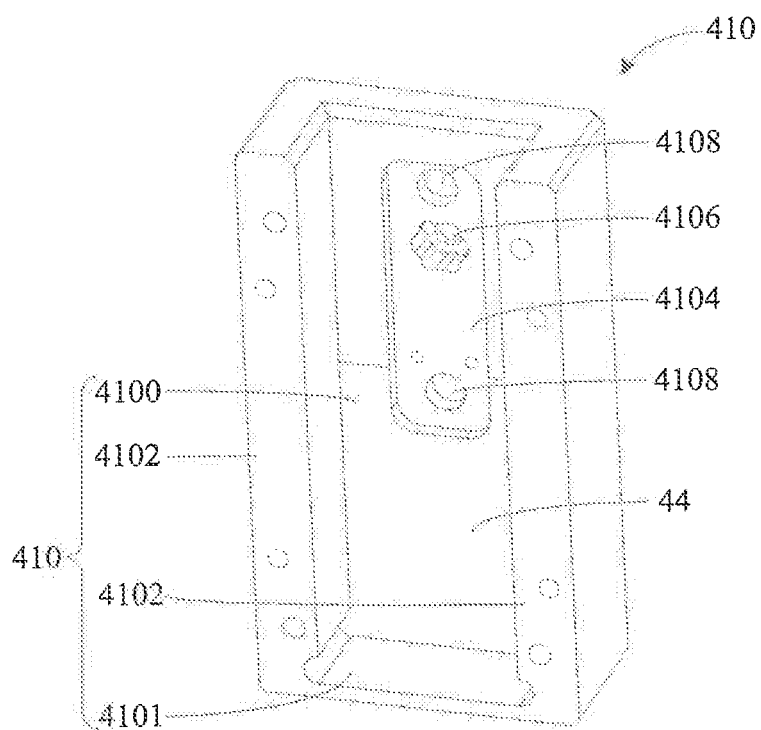
FIG. 14 is a schematic structural view of a fixing block body of the clamping apparatus shown in FIG. 11.
Figure 15:
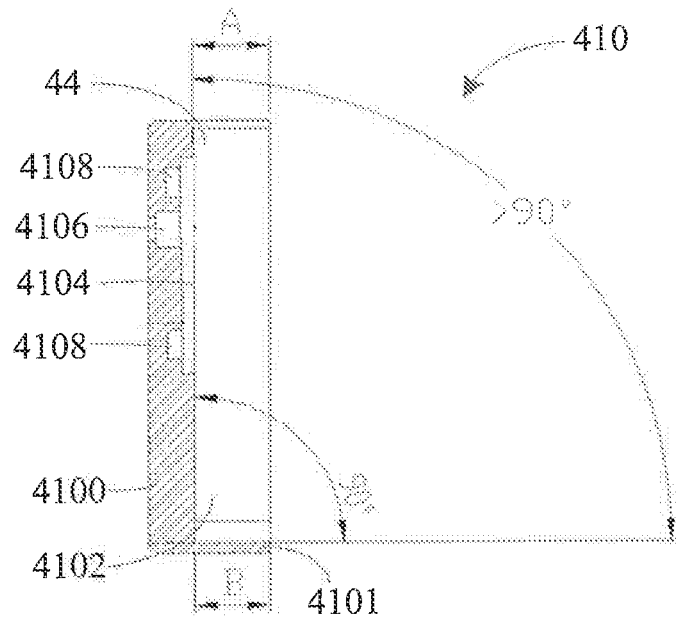
FIG. 15 is a sectional view of the fixing block body shown in FIG. 14.

Referring to FIG. 14 and FIG. 15 together, the fixing block body 410 includes a side wall 4100, a bottom wall 4101 and a connecting wall 4102. The bottom wall 4101 is connected to the side wall 4100 and the connecting wall 4102. There are two connecting walls 4102. The two connecting walls 4102 are connected to two opposite sides of the side wall 4100. Similarly, the two connecting walls 4102 are connected to two opposite sides of the bottom wall 4101. The two connecting walls 4102 and the bottom wall 4101 are fixedly mounted at the fixing plate 42. The side wall 4100, the bottom wall 4101, the connecting wall 4102 and the fixing plate 42 together enclose the accommodating cavity 44.

The side wall 4100 is provided with a concave groove 4104. The concave groove 4104 is configured to accommodate the locking elastic sheet 412. A threaded fixing through hole 4106 and an accommodating groove 4108 are provided in an inner wall of the concave groove 4104. The fixing through hole 4106 is a threaded hole and is configured to fit with the tightening knob 43. The accommodating groove 4108 is a blind hole. There are two accommodating grooves 4108 configured to accommodate the magnetic component 414. The two accommodating grooves 4108 are arranged in the vertical direction and the two accommodating grooves 4108 are respectively located on two sides of the fixing through hole 4106.

One side, near the bottom wall 4101, of the side wall 4100 is perpendicularly connected to the bottom wall 4101. The other side, away from the bottom wall 4101, of the side wall 4100, tilts in a direction away from the accommodating cavity 44, so that an obtuse angle is formed between the other side, away from the bottom wall 4101, of the side wall 4100 and the bottom wall 4101. A width B of one side, near the bottom wall 4101, of the connecting wall 4102 is less than a width A of the other side, away from the bottom wall 4101, of the connecting wall 4102. That is, the width of the bottom portion of the accommodating cavity 44 is smaller than the width of the mouth portion of the accommodating cavity 44, so that a fixing rod 200 of the calibration apparatus is easily inserted in the accommodating cavity 44 and when the fixing rod 200 of the calibration apparatus is inserted in the bottom portion of the accommodating cavity 44, the fixing rod 200 of the calibration apparatus is securely fixed in the accommodating cavity 44.

Referring to FIG. 13 again, the fixing plate 42 is a rectangular plate and may be made of a material with relatively high strength, for example, a stainless steel material.

The tightening knob 43 includes a push rod 430 and a knob portion 432. The push rod 430 has an external thread and passes through the fixing through hole 4106, so that one end of the push rod 430 extends into the accommodating cavity 44. The push rod 430 is threaded to the fixing through hole 4106. The knob portion 432 is cylindrical, is fixedly mounted at the other end of the push rod 430 and is configured to assist a user in holding and rotating the tightening knob 43.

In this embodiment, there are two fixing blocks 41 and two tightening knobs 43. The two fixing blocks 41 are respectively fixedly mounted at the fixing plate 42 and the two fixing blocks 41 are located on a same side of the fixing plate 42. The two fixing blocks 41 are arranged in the horizontal direction.

Figure 16:
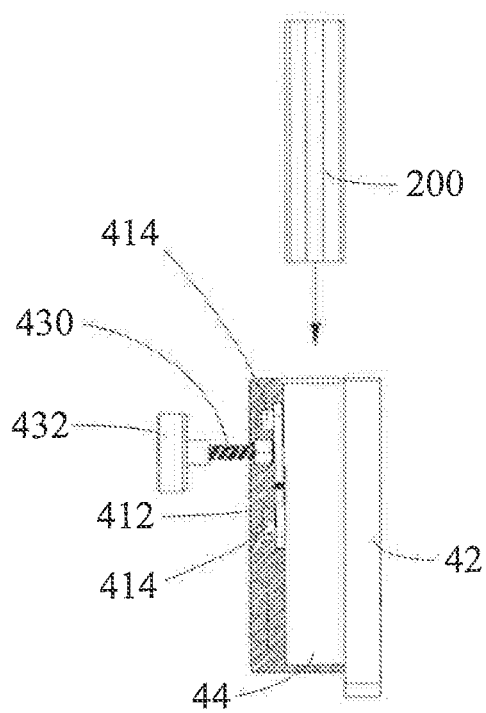
FIG. 16 is a diagram showing a use state of the clamping apparatus shown in FIG. 11, where a fixing rod is located outside the clamping apparatus.

Referring to FIG. 16, when the knob portion 432 rotates counterclockwise, the push rod 430 moves in a direction away from the locking elastic sheet 412. The push rod 430 and the locking elastic sheet 412 do not contact. In this case, the magnetic component 414 attracts the locking elastic sheet 412 in a direction away from the fixing plate 42, so that the size of the mouth portion of the accommodating cavity 44 increases to facilitate the insertion of the fixing rod 200.

Figure 17:
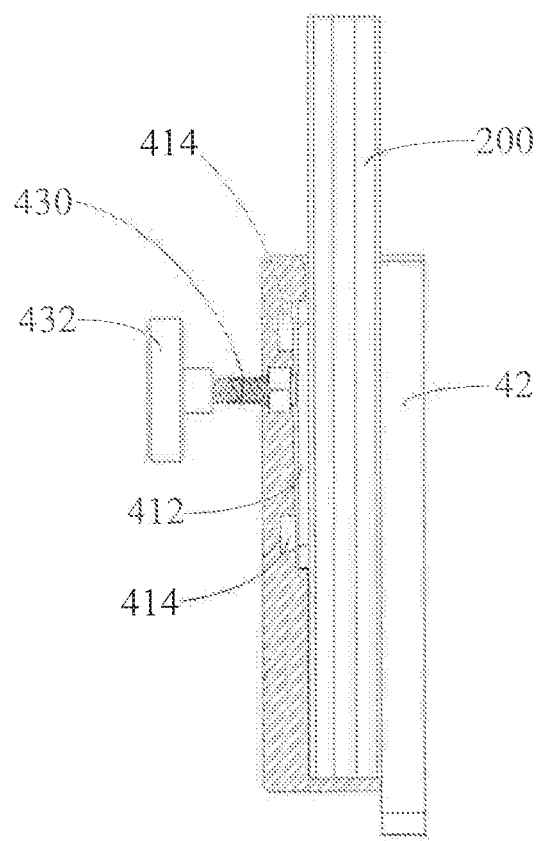
FIG. 17 is a diagram showing a use state of the clamping apparatus shown in FIG. 11, where a fixing rod is inserted in the clamping apparatus.

Referring to FIG. 17, when the fixing rod 200 is inserted in the bottom portion of the accommodating cavity 44, the knob portion 432 rotates clockwise, the push rod 430 comes into contact with the locking elastic sheet 412 to push the locking elastic sheet 412 to abut the fixing rod 200, so as to clamp the fixing rod 200 in the accommodating cavity 44.

In this embodiment, the tightening knob 43 pushes the locking elastic sheet 412 to abut an apparatus that needs to be clamped, for example, the fixing rod 200. Because the locking elastic sheet 412 is in surface contact with the apparatus that needs to be clamped, a frictional force between the locking elastic sheet 412 and the apparatus that needs to be clamped is increased, to enable the locking elastic sheet 412 to securely abut the apparatus that needs to be clamped. The locking elastic sheet 412 and the apparatus that needs to be clamped require lower assembly precision and it is convenient to rapidly assemble the apparatus that needs to be clamped at the clamping apparatus 40. In addition, the magnetic component 414 is configured to attract the locking elastic sheet 412 in the direction away from the fixing plate 42, so that the size of the mouth portion of the accommodating cavity 44 can be conveniently increased to facilitate the insertion of the apparatus that needs to be clamped.

Figure 18:
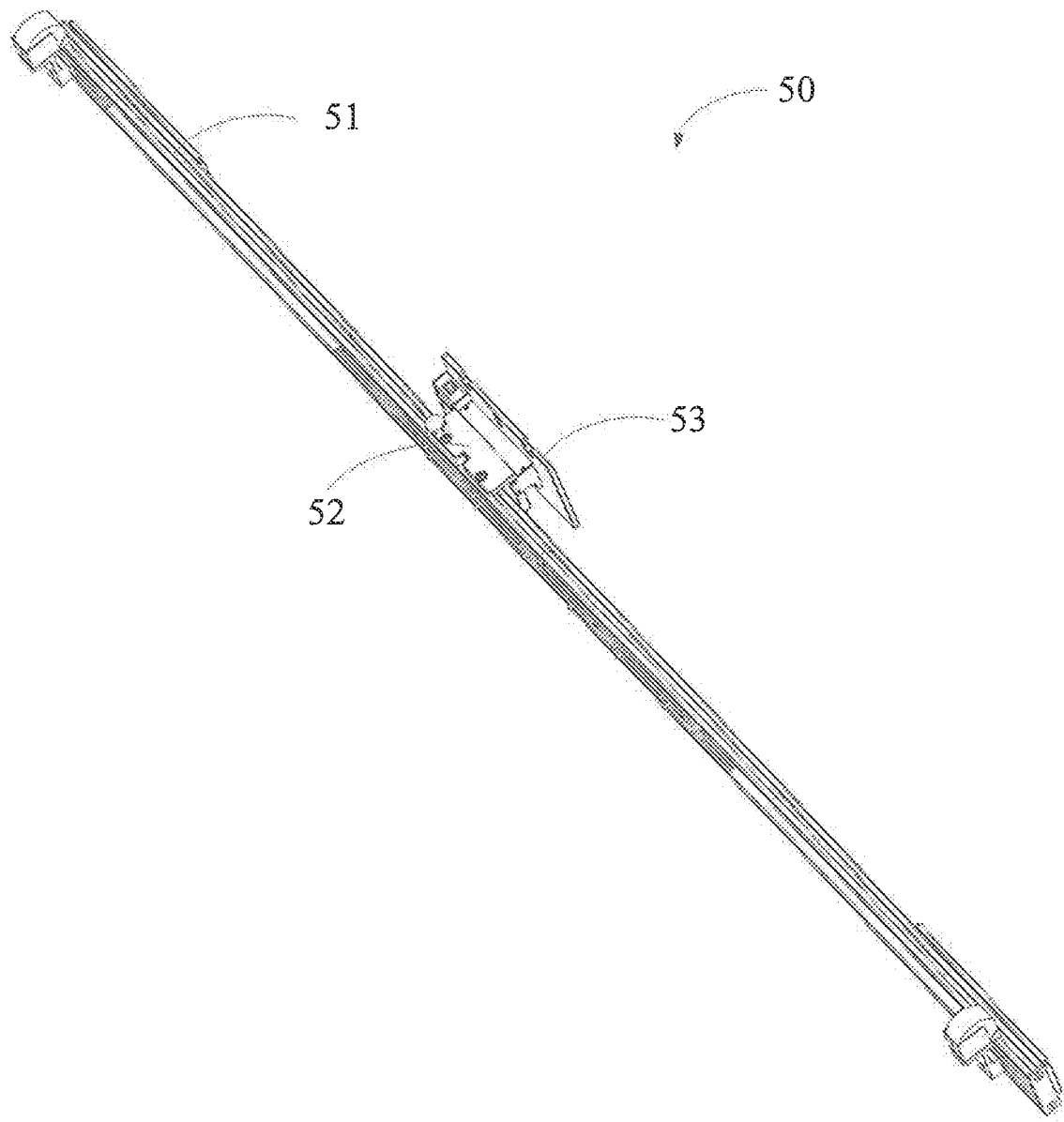
FIG. 18 is a schematic structural view of a slide apparatus of the automobile calibration device shown in FIG. 1.
Figure 19:
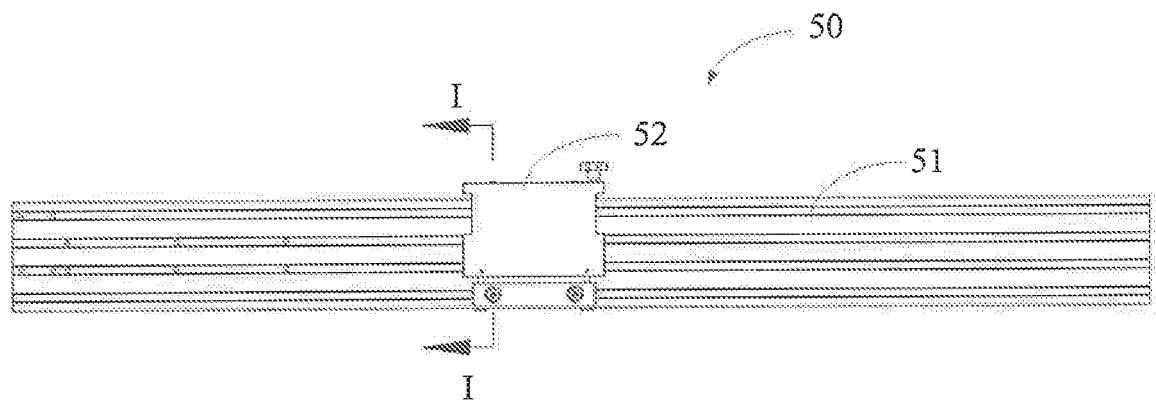
FIG. 19 is a front view of the slide apparatus shown in FIG. 18, where a hanging assembly of the slide apparatus is omitted.
Figure 20:
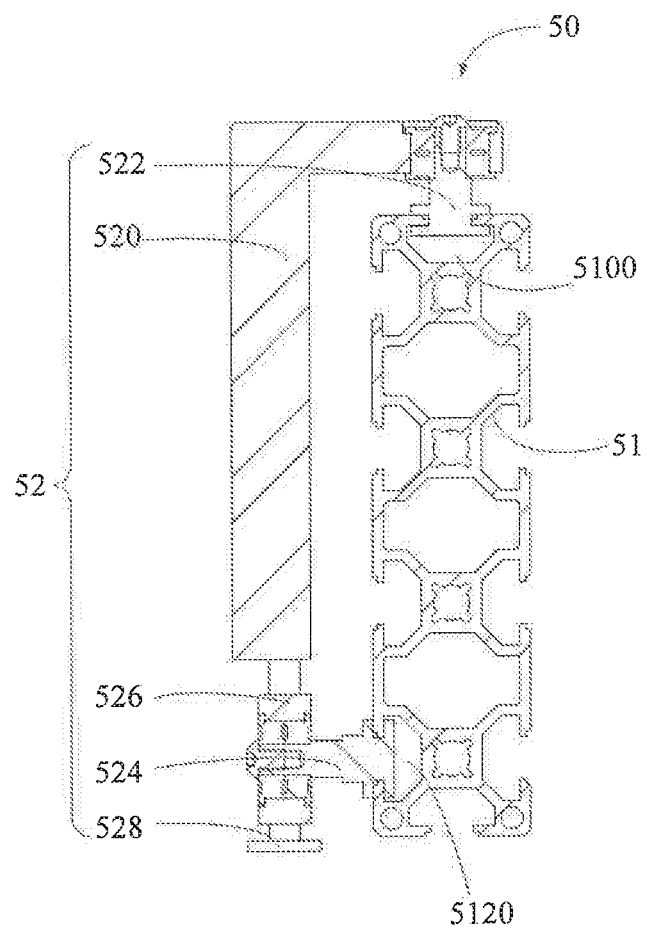
FIG. 20 is a sectional view of the slide apparatus shown in FIG. 18 in a direction I-I.

Referring to FIG. 18 to FIG. 20, the slide apparatus 50 includes a guiderail 51, a slide assembly 52 and a hanging assembly 53. The guiderail 51 may be fixedly mounted at the fixing plate 42 in any suitable manner (for example, the guiderail 51 may be fixedly mounted at the fixing plate 42 in a manner of screw connection) and the guiderail 51 is disposed in the horizontal direction. The slide assembly 52 may be movably mounted at the guiderail 51 and may be slidable along the guiderail 51 (in other words, movable in the horizontal direction with respect to the guiderail 51). The hanging assembly 53 is fixedly mounted at the slide assembly 52 and is slidable with the slide assembly 52 along the guiderail 51.

Figure 21:
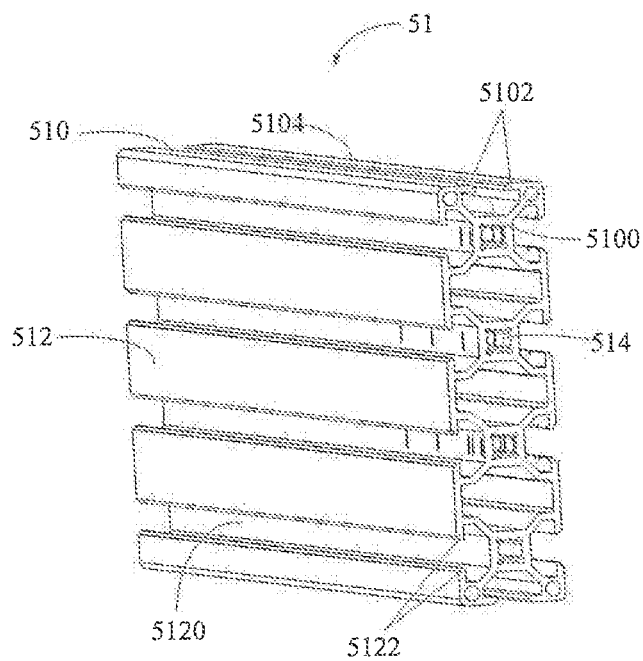
FIG. 21 is a schematic structural view of a guiderail of the slide apparatus shown in FIG. 18.

Specifically, referring to FIG. 21, the guiderail 51 is approximately a cuboid and includes a first surface 510 and a second surface 512 perpendicular to each other. The first surface 510 is perpendicular to the plane in which the fixing plate 42 is located and the second surface 512 is parallel to the plane in which the fixing plate 42 is located and is opposite the fixing plate 42. Particularly, in this embodiment, a plurality of through holes 514 having a predetermined shape is further provided in the guiderail 51 in the horizontal direction and is configured to disperse the stress in the guiderail 51. In addition, the weight of the guiderail 51 is reduced while the rigidity requirement of the guiderail 51 is satisfied. It may be understood that, in some other embodiments, these through holes 514 may be omitted.

A first slide groove 5100 configured to mount the slide assembly 52 is provided in the first surface 510. The first slide groove 5100 extends in the horizontal direction. A cross section of the first slide groove 5100 is approximately "trapezoidal" and a width of the bottom portion of the first slide groove 5100 is less than the width near the opening, so that a frictional area between the slide assembly 52 and the first slide groove 5100 is reduced to enable the slide assembly 52 to slide more smoothly along the first slide groove 5100. Further, in this embodiment, the opening of the first slide groove 5100 has a "T shape" and first clamp portions 5102 extending towards each other are disposed and configured to limit the slide assembly 52, thereby reducing shaking of the slide assembly 52 and preventing the slide assembly 52 from derailing.

In addition, the first surface 510 is further provided with a horizontal graduated scale 5104 with the center of the first surface 510 being the zero point and respectively extends towards two sides. That is, the scale values of the horizontal graduated scale 5104 use the center of the guiderail 51 as the zero point, respectively gradually increase towards two sides of the guiderail 51 and are configured to facilitate positioning of the slide assembly 52. It may be understood that, in some other embodiments, a horizontal graduated scale may be alternatively disposed on the second surface 512, or the horizontal graduated scale 5104 may be omitted.

The second surface 512 is provided with a second slide groove 5120 configured to mount the slide assembly 52. The second slide groove 5120 and the first slide groove 5100 are disposed in parallel. That is, the second slide groove 5120 also extends in the horizontal direction, so that the slide assembly 52 can slide along both the first slide groove 5100 and the second slide groove 5120 and further move in the horizontal direction with respect to the guiderail 51. Similarly, in this embodiment, a cross section of the second slide groove 5120 is also approximately "trapezoidal" and a width of a bottom portion of the second slide groove 5120 is less than a width of the second slide groove 5120 near the opening, so that a frictional area between the slide assembly 52 and the second slide groove 5120 is reduced and the slide assembly 52 can slide along the second slide groove 5120 more smoothly. Further, in this embodiment, the opening of the second slide groove 5120 also has a "T shape" and second clamp portions 5122 extending towards each other are disposed and configured to limit the slide assembly 52, thereby reducing shaking of the slide assembly 52 and preventing the slide assembly 52 from derailing.

In this embodiment, a width of the second surface 512 is greater than a width of the first surface 510. There are four second slide grooves 5120. The four second slide grooves 5120 are disposed in parallel at intervals in the second surface 512. Each second slide groove 5120 may be configured to mount the slide assembly 52. It may be understood that, in some other embodiments, the quantity of the second slide grooves 5120 may be increased or reduced according to an actual requirement. For example, the quantity is reduced to 1, 2, or increased to 5. This is not specifically limited in this embodiment of the present invention. Similarly, in still some other embodiments, a plurality of first slide grooves 5100 may be alternatively disposed on the first surface 510.

It may be understood that, in this embodiment, the cross sections of the first slide groove 5100 and the second slide groove 5120 are approximately "trapezoidal" and the first clamp portions 5102 and the second clamp portions 5122 are respectively disposed at the openings of the first slide groove 5100 and the second slide groove 5120 to enable the slide assembly 52 to slide more smoothly and prevent the slide assembly 52 from derailing. In some other embodiments, the first slide groove 5100 and the second slide groove 5120 may have other suitable structures and are for example, strip-shaped concave grooves or T-shaped concave grooves.

Figure 22:
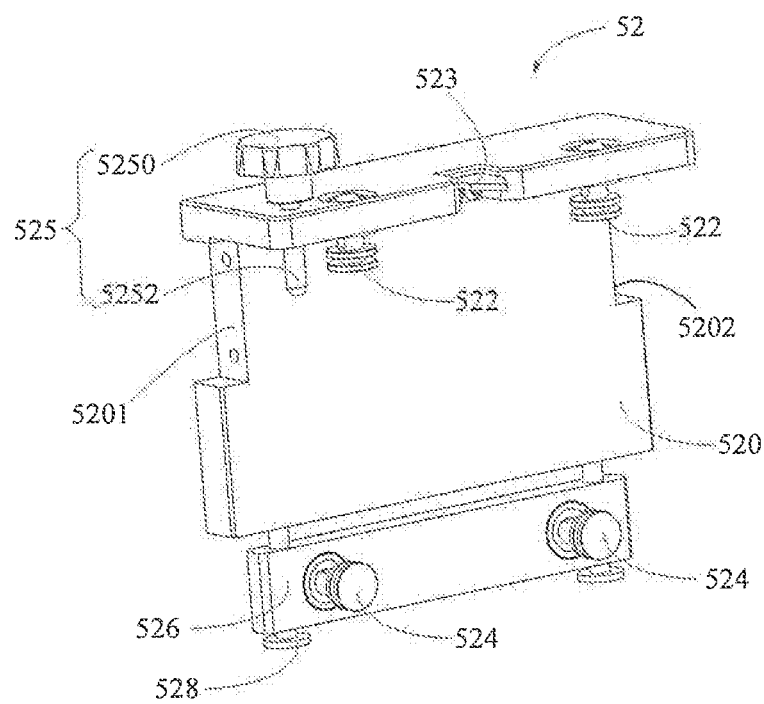
FIG. 22 is a schematic structural view of a slide assembly of the slide apparatus shown in FIG. 18.

Specifically, referring to FIG. 22, the slide assembly 52 includes a plate body 520, a first slide member 522 and a second slide member 524. One end of the first slide member 522 and one end of the second slide member 524 are respectively mounted at the plate body 520. The other end of the first slide member 522 is movably mounted at the first slide groove 5100, the first slide member 522 is slidable along the first slide groove 5100, the other end of the second slide member 524 is movably mounted at the second slide groove 5120 and the second slide member 524 is slidable along the second slide groove 5120, so that the plate body 520 is slidable along the guiderail 51.

The slide assembly 52 further includes a mounting plate 526 and a guide shaft 528. An end of the second slide member 524 is fixedly mounted at the mounting plate 526. The mounting plate 526 is mounted at the plate body 520 through the guide shaft 528 and the mounting plate 526 is movable along the guide shaft 528 with respect to the plate body 520 (in other words, the mounting plate 526 can move along the guide shaft 528 towards or away from the plate body 520). Therefore, when the slide assembly 52 is mounted at the guiderail 51 (that is, the first slide member 522 is mounted at the first slide groove 5100 and the second slide member 524 is mounted at the second slide groove 5120), the guide shaft 528 is adjusted to adjust the distance between the mounting plate 526 and the plate body 520, so that an assembly error between the slide assembly 52 and the guiderail 51 can be adjusted, to enable the slide assembly 52 to slide more smoothly on the guiderail 51. Certainly, in an actual application, the first slide member 522 may be alternatively mounted at the plate body 520 through another pair of the mounting plate 526 and the guide shaft 528. Alternatively, the first slide member 522 and the second slide member 524 are both directly fixedly mounted on the plate body 520.

The plate body 520 is configured to mount the hanging assembly 53, to enable the hanging assembly 53 to slide along the guiderail 51. Specifically, in this embodiment, the plate body 520 is approximately "L-shaped", the first slide member 522 is mounted at one end of the plate body 520 and the second slide member 524 is mounted at the other end of the plate body 520. In the plate body 520, an inner side surface of one end of the first slide member 522 is mounted to face the first surface 510, an inner side surface of one end of the second slide member 524 is mounted to face the second surface 512, so that the first slide member 522 can be movably mounted at the first slide groove 5100 and, the second slide member 524 can be movably mounted at the second slide groove 5120. It may be understood that, in this embodiment, when an "L-shaped" plate body 520 is adopted, the quantity of parts of a slide assembly 52 can be reduced, thereby reducing costs. In some other embodiments, the shape of the plate body 520 may be alternatively not limited to an "L shape". For example, the plate body 520 may alternatively have a panel form and the first slide member 522 is mounted at the plate body 520 through another part.

A scale pointer 523 is disposed on a side, on which the first slide member 522 is mounted, of the plate body 520. After the slide assembly 52 is mounted at the guiderail 51, the scale pointer 523 is located right above the horizontal graduated scale 5104 to facilitate calibration of the position of the plate body 520. Optionally, the scale pointer 523 is disposed at the centerline of the plate body 520 in the horizontal direction. Certainly, it may be understood that, in some other embodiments, if the horizontal graduated scale 5104 is disposed on the second surface 512, the scale pointer 523 is correspondingly disposed on a side, on which the second slide member 524 is mounted, of the plate body 520.

Two opposite sides of the plate body 520 are respectively provided with a first mounting groove 5201 and a second mounting groove 5202 that are configured to mount the hanging assembly 53. The first mounting groove 5201 and the second mounting groove 5202 are aligned in a sliding direction of the plate body 520. In this embodiment, the first mounting groove 5201 and the second mounting groove 5202 are disposed, so that the bearing capability of the plate body 520 in the vertical direction can be improved and the hanging assembly 53 can be more stably and fixedly mounted at the plate body 520. It may be understood that, in some other embodiments, the first mounting groove 5201 and the second mounting groove 5202 may be omitted.

Moreover, the slide assembly 52 further includes a locking member 525 configured to abut the guiderail 51, so that the plate body 520 is fixed at the guiderail 51. In this embodiment, a threaded hole (not shown) is further provided in the side, on which the first slide member 522 is mounted, of the plate body 520 and is configured to mount the locking member 525. Specifically, the locking member 525 may include a knob 5250 and a threaded rod 5252. The knob 5250 is fixed at one end of the threaded rod 5252 and the other end of the threaded rod 5252 may pass through the threaded hole to abut or leave the guiderail 51. Specifically, when a user tightens the knob 5250 to enable the other end of the threaded rod 5252 to abut the guiderail 51, the plate body 520 may be fixed at the guiderail 51. When the user loosens the knob 5250 to enable the other end of the threaded rod 5252 to leave the guiderail 51, the plate body 520 may slide with respect to the guiderail 51 to facilitate readjustment of the position of the plate body 520. Similarly, it may be understood that, in some other embodiments, the locking member 525 may be alternatively mounted at another suitable position of the plate body 520, for example, mounted on the side, on which the second slide member 524 is mounted, of the plate body 520. In addition, the specific structure of the locking member 525 may be not limited to the structure described in the foregoing, provided that the plate body 520 can be fixed or moved with respect to the guiderail 51.

There are two first slide members 522. The two first slide members 522 are horizontally arranged along the first slide groove 5100.

Figure 23:
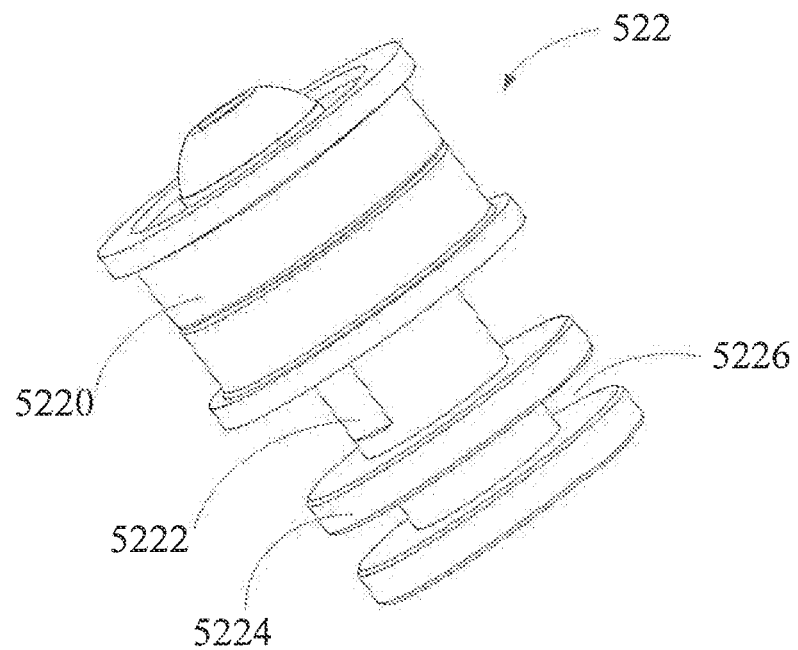
FIG. 23 is a schematic structural view of a first slide member of the slide assembly shown in FIG. 22.

Specifically, referring to FIG. 23, the first slide member 522 includes a first bearing 5220, a first pin shaft 5222 and a first roller 5224. The first bearing 5220 is sleeved over one end of the first pin shaft 5222 and the first roller 5224 is disposed at the other end of the first pin shaft 5222. The first bearing 5220 is fixedly mounted at the plate body 520. The first roller 5224 is movably mounted at the first slide groove 5100 and can roll along the first slide groove 5100. In an actual application, the first pin shaft 5222 is rotatable with respect to the first bearing 5220 and/or, the first roller 5224 is rotatable with respect to the first pin shaft 5222. This is not specifically limited in this embodiment of the present invention.

The first roller 5224 has an "H shape" and is provided with a first annular concave groove 5226. After the first slide member 522 is mounted at the first slide groove 5100, as shown in FIG. 20, the first clamp portions 5102 of the first slide groove 5100 are claimed in the first annular concave groove 5226 and the first roller 5224 can roll along the first clamp portions 5102.

There are also two second slide members 524. The two second slide members 524 are horizontally arranged along the second slide groove 5120. Particularly, in this embodiment, the two second slide members 524 are disposed at an end away from the first surface 510 (that is, disposed in a second slide groove 5120 away from the first surface 510) and are configured to balance the force applied to the plate body 520, thereby improving the load capability of the plate body 520. In some other embodiments, the second slide members 524 may be alternatively disposed in another second slide groove 5120, provided that the second slide members 524 can slide in the horizontal direction with respect to the guiderail 51.

Figure 24:
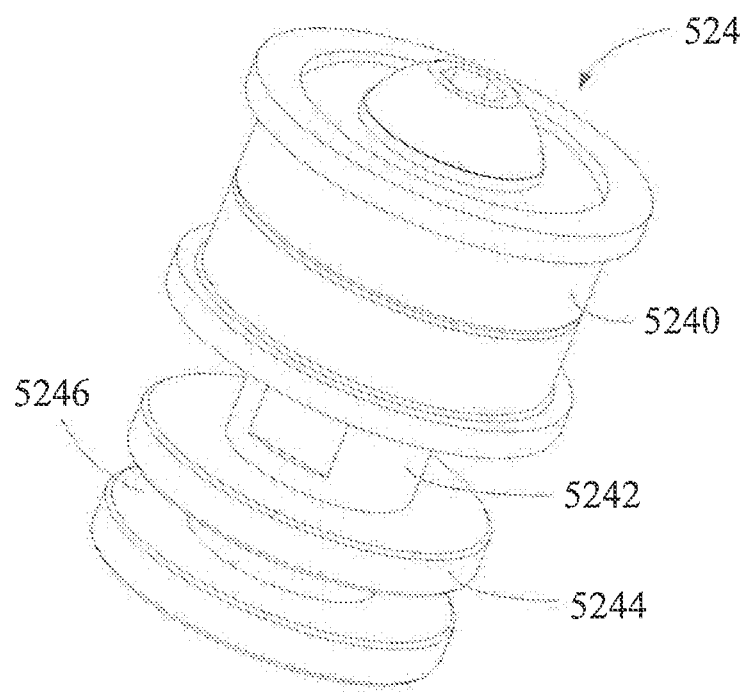
FIG. 24 is a schematic structural view of a second slide member of the slide assembly shown in FIG. 22.

Specifically, referring to FIG. 24, the structure of the second slide member 524 is the same as the structure of the first slide member 522 and the second slide member 524 includes a second bearing 5240, a second pin shaft 5242 and a second roller 5244. The second bearing 5240 is sleeved over one end of the second pin shaft 5242 and the second roller 5244 is disposed at the other end of the second pin shaft 5242. The second bearing 5240 is fixedly mounted at the mounting plate 526 and the second roller 5244 is movably mounted at the second slide groove 5120 and can roll along the second slide groove 5120. Similarly, in an actual application, the second pin shaft 5242 is rotatable with respect to the second bearing 5240 and/or, the second roller 5244 is rotatable with respect to the second pin shaft 5242. This is not specifically limited in this embodiment of the present invention.

The second roller 5244 has an "H shape" and is provided with a second annular concave groove 5246. After the second slide member 524 is mounted at the second slide groove 5120, as shown in FIG. 20, the second clamp portions 5122 of the second slide groove 5120 is clamped at the second annular concave groove 5246 and the second roller 5244 can roll along the second clamp portions 5122.

It may be understood that, in this embodiment, there are two first slide members 522 and the two first slide members 522 are horizontally disposed along the first slide groove 5100. There are also two second slide members 524 and the two second slide members 524 are horizontally disposed along the second slide groove 5120, so that the load capability of the plate body 520 is improved and the plate body 520 can slide more stably on the guiderail 51, thereby improving the reliability of the slide assembly 52. In some other embodiments, the quantity of the first slide members 522 and the quantity of the second slide members 524 may be set according to an actual requirement. For example, one first slide member 522 and two second slide members 524 may be included. The first slide member 522 is disposed at the centerline between the two second slide members 524 to form a stable triangular structure. Alternatively, only one first slide member 522 and one second slide member 524 are included. In still some other embodiments, to further inhibit the plate body 520 from turning over in the horizontal direction, a third slide member may further be disposed on another lateral surface (that is, the surface opposite the first surface 510) perpendicular to the second surface 512.

It may be understood that, in this embodiment, the first slide member 522 and the second slide member 524 are both combined structures of a bearing, a pin shaft and a roller to use a rolling manner to reduce a frictional force between the slide assembly 52 and the guiderail 51, to enable the slide assembly 52 to move more smoothly with respect to the guiderail 51. In addition, the first roller 5224 and the second roller 5244 both have an "H" shape. The first roller 5224 is provided with the first annular concave groove 5226 and the second roller 5244 is provided with the second annular concave groove 5246 for respective adaptation with the first clamp portions 5102 in the first slide groove 5100 and the second clamp portions 5122 in the second slide groove 5120, thereby reducing a frictional force between a roller and a slide groove and limiting a roller to prevent the roller from derailing. In some other embodiments, the first slide member 522 and/or the second slide member 524 may adopt another structure, provided that the first slide member 522 and/or the second slide member 524 is slidable along the guiderail 51 slide horizontally. For example, the first slide member 522 may be a first slide block and the first slide block is accommodated in the first slide groove 5100 and is slidable along the first slide groove 5100; and/or, the second slide member 524 may be a second slide block and the second slide block is accommodated in the second slide groove 5120 and is slidable along the second slide groove 5120.

Figure 25:
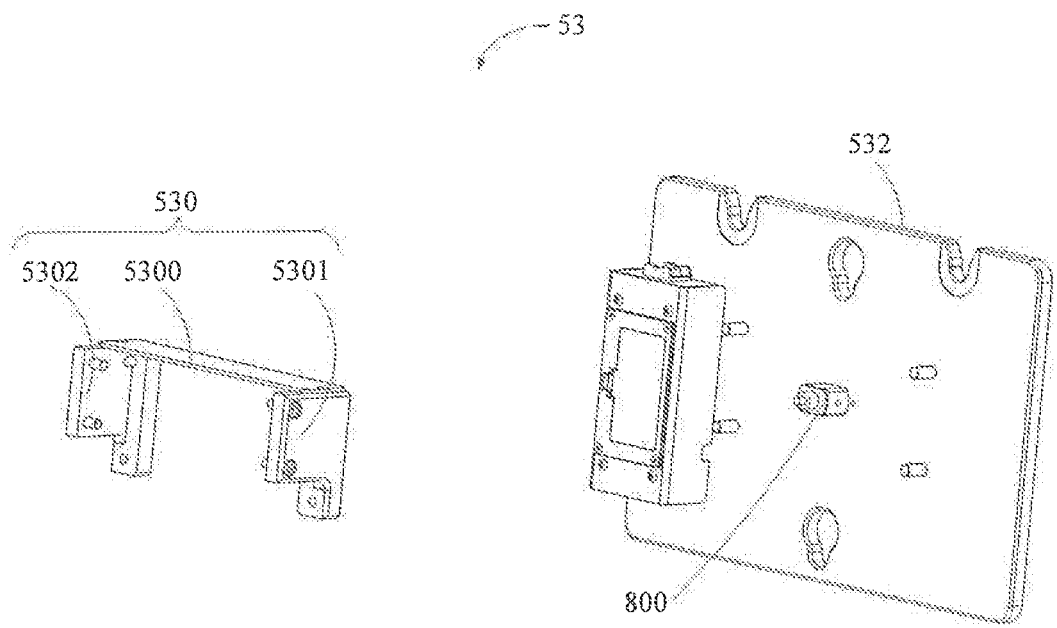
FIG. 25 is an exploded view of a hanging assembly of the slide apparatus shown in FIG. 18.
Figure 26:
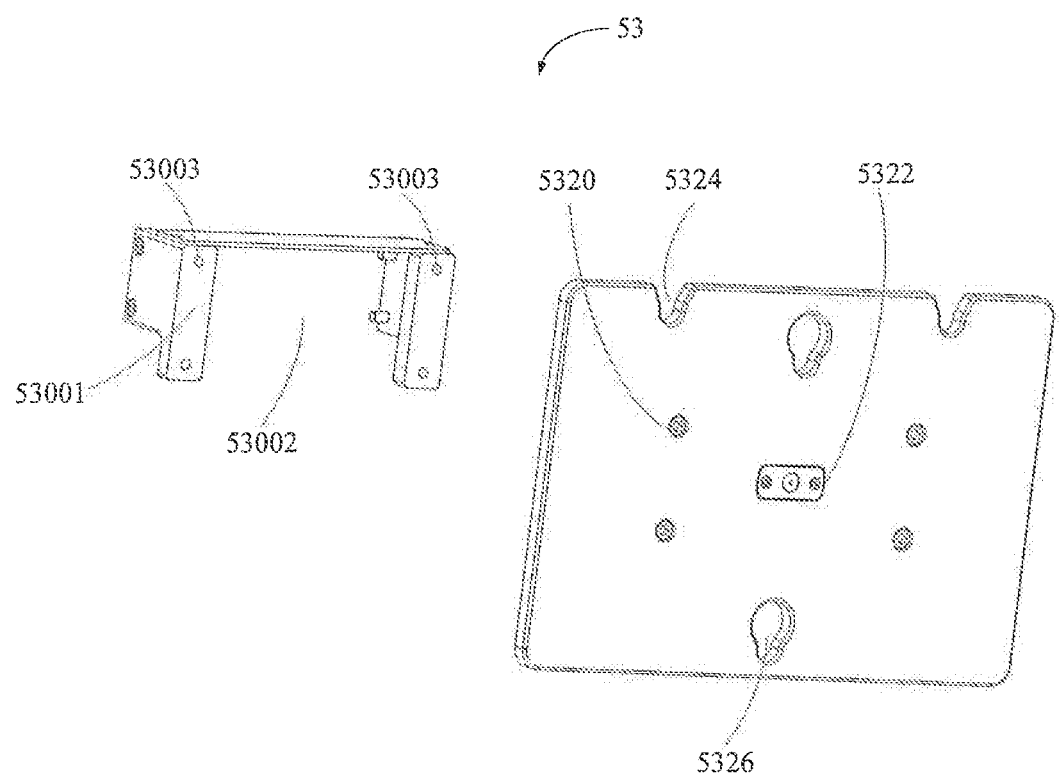
FIG. 26 is an exploded view of the hanging assembly shown in FIG. 25 from another angle.

Referring to FIG. 18, FIG. 25 and FIG. 26 together, the hanging assembly 53 includes a mounting member 530 and a hanging member 532. The hanging member 532 is fixedly mounted at the plate body 520 through the mounting member 530.

Specifically, the mounting member 530 includes a base portion 5300, a first extending portion 5301 and a second extending portion 5302. The first extending portion 5301 and the second extending portion 5302 respectively extend from two opposite sides of the base portion 5300. An end, away from the base portion 5300, the first extending portion 5301 is inserted in the first mounting groove 5201 and is fixedly connected to the plate body 520. An end, away from the base portion 5300, the second extending portion 5302 is inserted in the second mounting groove 5202 and is fixedly connected to the plate body 520.

The base portion 5300 has a mounting surface 53001. The mounting surface 53001 is provided with a receiving groove 53002 and a plurality of mounting holes 53003. The plurality of mounting holes 53003 are arranged surrounding the receiving groove 53002.

The hanging member 532 is provided with a plurality of connecting through holes 5320 corresponding to the mounting holes 53003. The plurality of connecting through holes 5320 is configured to fixedly mount the hanging member 532 at the mounting member 530. After the hanging member 532 is mounted at the mounting surface 53001, the receiving groove 53002 may be closed to form an accommodating space.

A laser mounting hole 5322 is provided in the middle of the hanging member 532 and is configured to mount a calibration laser 800. After the calibration laser 800 is mounted at the hanging member 532, a part of the calibration laser 800 is accommodated in the accommodating space.

The hanging member 532 has a rectangular plate form. A notch 5324 is provided in a side of the hanging member 532 and is configured to hang a calibration assistance device (for example, a radar calibration plate and a reflector). A hanging hole 5326 is further provided in the hanging member 532 and is configured to hang another calibration assistance device (for example, a night vision device and a blind spot monitor). In the hanging manner, it may be simpler to mount a calibration assistance device and the stand apparatus 10, thereby improving user experience.

In some embodiments, the hanging assembly 53 may be omitted. The calibration laser 800 and/or the calibration assistance device are/is mounted at the plate body 520 in another manner.

In some embodiments, the slide assembly 52 and the hanging assembly 53 are not necessary for support the calibration apparatus. The calibration apparatus can be directly supported by the guiderail 51, and may be slidable along the guiderail 51.

Figure 27:
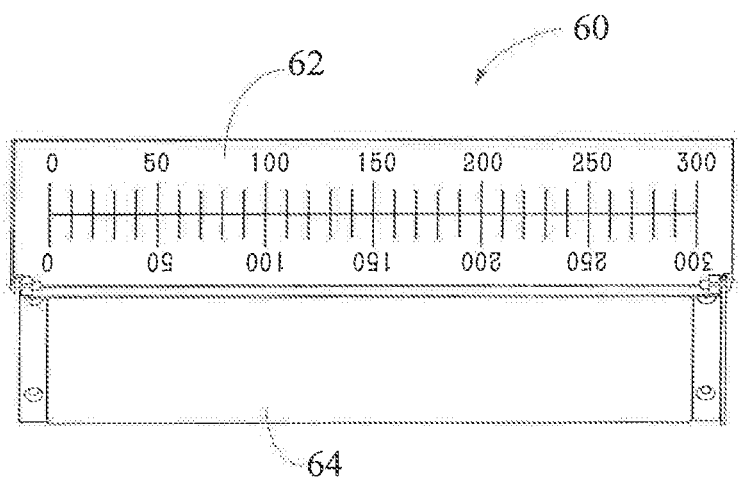
FIG. 27 is a schematic structural view of a scale apparatus of the automobile calibration device shown in FIG. 1.

Referring to FIG. 3 and FIG. 27 together, there are two scale apparatuses 60. The two scale apparatuses 60 are respectively mounted at two opposite ends of the guiderail 51 and the two scale apparatuses 60 are symmetrically disposed with respect to the centerline of O1 of the guiderail 51. Each scale apparatus 60 includes a scale plate 62 and a reflector 64. The scale plate 62 is connected to the reflector 64 and the scale plate 62 is located right above the reflector 64. The reflector 64 is configured to reflect a laser beam. The scale plate 62 is configured to determine that the laser beam is projected at the position of the reflector 64.

Figure 28:
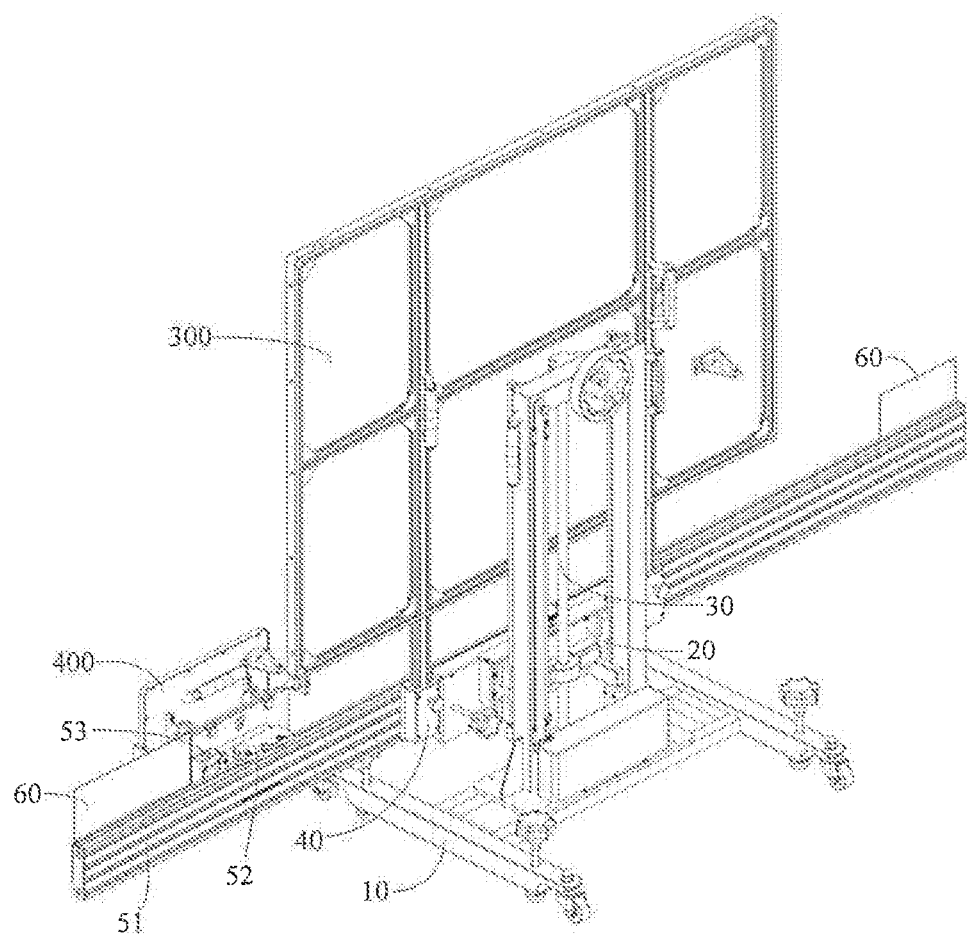
FIG. 28 is a diagram showing a use state of the automobile calibration device shown in FIG. 1.

Referring to FIG. 28, during use, a fixing rod of a pattern plate 300 may be inserted in the clamping apparatus 40 and a radar calibration plate 400 may be hung at the hanging member 532. By using the position adjustment apparatus 20, the horizontal position of the clamping apparatus 40 can be precisely adjusted, so that the pattern plate 300 can be moved to a required position. The slide assembly 52 slides along the guiderail 51, so that the radar calibration plate 400 can be moved to the required position.

Figure 29:
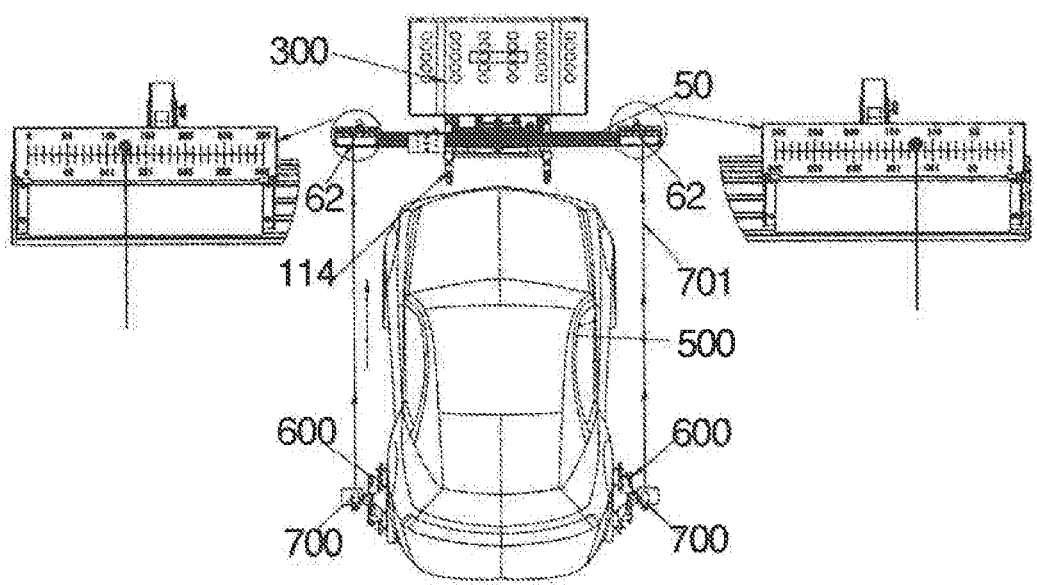
FIG. 29 is a schematic view of using the automobile calibration device provided in the embodiment of the present invention to calibrate an automobile to be calibrated.

Referring to FIG. 29 together, the calibration of the centerline of an automobile 500 to be calibrated by using the automobile calibration device 100 is specifically as follows:

Before calibration, the automobile calibration device 100 is moved right in front of the automobile 500 to be calibrated and four height adjustment members 114 are rotated down to enable the roller 112 to leave the ground, so that the stand apparatus 10 can be stably fixed right in front of the automobile 500 to be calibrated.

One hub clamp 600 is mounted at each rear wheel of the automobile 500 to be calibrated. A point laser 700 is configured on each hub clamp 600. Each point laser 700 is configured to emit a point laser beam 701 to a corresponding scale plate 62. The ascending button 3222 or the descending button 3224 is triggered to enable each scale plate 62 to be approximately in the same horizontal plane as a corresponding point laser 700.

Two scale plates 62 are adjusted according to the width of the automobile 500 to be calibrated. Each point laser 700 is turned on, so that the point laser 700 emits a point laser beam 701 to a corresponding scale plate 62. A specific position of the emitted point laser beam 701 on the scale plate 62 is observed and the adjustment member 24 is adjusted to enable the scale plate 62 to move horizontally, until the reading of the point laser beam 701 on the scale plate 62 is consistent. In this case, the centerline of the automobile 500 to be calibrated is aligned with the centerline of the guiderail 51 and the pattern plate 300 may be configured to calibrate the camera of the automobile 500 to be calibrated.

Finally, it should be noted that the above embodiments are merely provided for describing the technical solutions of the present invention, but not intended to limit the present invention. In the concept of the present invention, in the foregoing embodiments or different embodiments, technical features may be combined, steps may be implemented in any sequence and many another variations in different aspects of the present invention may exist. For brevity, these are not provided in the details. It should be understood by a person of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the scope of the present invention.

What is claimed is:

1. An automobile calibration device, comprising:
    a stand apparatus;
    a supporting assembly, mounted at the stand apparatus and movable in a vertical direction with respect to the stand apparatus, and configured to support a calibration apparatus which is assistant to calibrate a vehicle; and
    a drive assembly, configured to drive the supporting assembly to move in the vertical direction with respect to the stand apparatus;
    wherein the drive assembly comprises a motor assembly and a transmission mechanism;
    the motor assembly is configured to drive the transmission mechanism to move; and
    the transmission mechanism is configured to enable the supporting assembly to move in the vertical direction with respect to the stand apparatus; wherein
    the motor assembly further comprises a control assembly a motor; and
    the control assembly comprises a controller, the controller being electrically connected to the motor and being configured to control a rotational rate of the motor, so as to control the movement speed of the supporting assembly, wherein the control assembly further comprises a limit switch and a trigger apparatus;
    the limit switch and the trigger apparatus are electrically connected;
    when the supporting assembly touches the trigger apparatus, the trigger apparatus triggers the limit switch to cut off the power supply to the motor.

2. The automobile calibration device according to claim 1, wherein the trigger apparatus is located on the stand apparatus, and is connectable with the supporting assembly when the supporting assembly is moving in the vertical direction with respect to the stand apparatus.

3. The automobile calibration device according to claim 2, wherein the limit switch is electrically connected with the controller, when the limit switch is triggered by the trigger apparatus, the limit switch sends a cut-off signal to the controller, to enable the controller to cut off the power supply to the motor.

4. The automobile calibration device according to claim 2, wherein the limit switch is electrically connected with the controller, when the limit switch is triggered by the trigger apparatus, the limit switch sends a signal to the controller, the controller controls the motor to rotate in an opposite direction, to make the supporting assembly reverse movement direction.

5. The automobile calibration device according to claim 1, wherein the limit switch and the trigger apparatus are set on the stand apparatus, the movement range of the supporting assembly is determined by the height of the limit switch and the trigger apparatus.

6. The automobile calibration device according to claim 5, wherein the limit switch and the trigger apparatus together are at a location of at least one of the top end and the bottom end of the stand apparatus.

7. The automobile calibration device according to claim 1, wherein the control assembly further comprises an ascending button and a descending button;
    the ascending button and the descending button are electrically connected to the controller;
    when detecting a signal from the ascending button, the controller is configured to control the motor to rotate in the first rotational direction, to enable the supporting assembly to ascend in the vertical direction with respect to the stand apparatus; and
    when detecting a signal from the descending button, the controller is configured to control the motor to rotate in the second rotational direction, to enable the supporting assembly to descend in the vertical direction with respect to the stand apparatus.

8. The automobile calibration device according to claim 7, wherein when the ascending button and the descending button are triggered simultaneously, the controller is configured to control the motor to stop rotation.

9. The automobile calibration device according to claim 1, wherein the control assembly further comprises a stop button;
    the stop button is electrically connected to the controller;
    when detecting a signal from the stop button, the controller is configured to control the motor to stop rotation.

10. The automobile calibration device according to claim 1, wherein the control assembly further comprises a general button;
    the general button is electrically connected to the controller, and is configured to generate a signal by a user operation, wherein the signal indicates one of ascending, descending and stopping;
    when detecting the signal from the general button, the controller is configured to control the motor to rotate in a certain rotational direction or to stop rotating according to the signal.

11. The automobile calibration device according to claim 1, wherein the motor assembly further comprises a power supply assembly, the power supply assembly is configured to supply power to the motor assembly.

12. The automobile calibration device according to claim 1, wherein the transmission mechanism is an elevation screw rod;
    the elevation screw rod is movably mounted at the stand apparatus, the elevation screw rod is disposed vertically and the elevation screw rod is rotatable around the central axis of the elevation screw rod;
    the motor is configured to drive the elevation screw rod to rotate around the central axis of the elevation screw rod.

13. The automobile calibration device according to claim 12, wherein the supporting assembly connects with the elevation screw rod through a slide block;
- the slide block is affixed with the supporting assembly and sleeves over the elevation screw rod;
- when the elevation screw rod rotates around the central axis of the elevation screw rod, the slide block moves in the vertical direction with respect to the stand apparatus.

14. The automobile calibration device according to claim 1, wherein the motor assembly further comprises a connection mechanism;
- the connection mechanism is configured to connect the motor with the transmission mechanism;
- the motor drives the transmission mechanism to move via the connection mechanism.

15. The automobile calibration device according to claim 14, wherein,
- the transmission mechanism comprises an elevation screw rod;
- the connection mechanism comprises a first synchronous gear, a second synchronous gear and a drive belt;
- the motor connects with the first synchronous gear, and the motor drives the first synchronous gear to rotate;
- the drive belt connects the first synchronous gear to the second synchronous gear;
- when the motor rotates, the first synchronous gear drives the second synchronous gear through the drive belt to rotate, to enable the elevation screw rod to rotate around the central axis of the elevation screw rod.

16. The automobile calibration device according to claim 15, wherein, the first synchronous gear is fixedly mounted at a rotating shaft of the motor.

17. The automobile calibration device according to claim 14, wherein the drive belt comprises an assembly surface, and a peripheral surface of the first synchronous gear and a peripheral surface of the second synchronous gear are both provided with gear teeth, the gear teeth of the first synchronous gear and the gear teeth of the second synchronous gear being both in contact with the assembly surface and the assembly surface comprising a toothed area and a non-toothed area;
- the toothed area is capable of being meshed with the first synchronous gear and the second synchronous gear and the non-toothed area is capable of being in contact with the first synchronous gear and the second synchronous gear;
- when the motor rotates and the toothed area is meshed with and the first synchronous gear or the toothed area is meshed with the second synchronous gear, a rate of the second synchronous gear is a first preset rate value;
- when the motor rotates and the first synchronous gear and the second synchronous gear are only in contact with the non-toothed area, a rate of the second synchronous gear is a second preset rate value; and
- the first preset rate value is greater than the second preset rate value.

18. The automobile calibration device according to claim 1, wherein the stand apparatus comprises a base support and a vertical support, the base support supports the vertical support; and
- the motor assembly is located at the base support or the vertical support.

* * * * *